US012517321B2

(12) United States Patent
Kishimoto et al.

(10) Patent No.: US 12,517,321 B2
(45) Date of Patent: Jan. 6, 2026

(54) LENS BARREL AND IMAGING DEVICE

(71) Applicant: NIKON CORPORATION, Tokyo (JP)

(72) Inventors: Takashi Kishimoto, Tokyo (JP);
Kenichi Kitano, Tokyo (JP); Osamu Gomibuchi, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 176 days.

(21) Appl. No.: 17/984,317

(22) Filed: Nov. 10, 2022

(65) Prior Publication Data

US 2023/0069519 A1 Mar. 2, 2023

Related U.S. Application Data

(63) Continuation of application No. 16/648,492, filed as application No. PCT/JP2018/029645 on Aug. 7, 2018, now Pat. No. 11,520,116.

(30) Foreign Application Priority Data

Sep. 29, 2017 (JP) .................................. 2017-191148

(51) Int. Cl.
*G02B 7/02* (2021.01)
*G02B 7/04* (2021.01)
*G02B 7/10* (2021.01)
*G03B 3/10* (2021.01)
*G03B 17/14* (2021.01)
*G02B 27/00* (2006.01)

(52) U.S. Cl.
CPC .............. *G02B 7/04* (2013.01); *G02B 7/021* (2013.01); *G02B 7/102* (2013.01); *G03B 3/10* (2013.01); *G03B 17/14* (2013.01); *G02B 27/0018* (2013.01)

(58) Field of Classification Search
CPC .......... G02B 7/04; G02B 7/021; G02B 7/102; G02B 27/0018; G03B 3/10; G03B 17/14
USPC .................................. 359/694–706, 822–826
See application file for complete search history.

(56) References Cited

U.S. PATENT DOCUMENTS

| 7,203,009 B2 | 4/2007 | Yamamoto |
| 10,495,842 B2* | 12/2019 | Shiraishi .................. G02B 7/09 |
| 2004/0141736 A1 | 7/2004 | Nomura |

(Continued)

FOREIGN PATENT DOCUMENTS

| CN | 103765273 A | 4/2014 |
| JP | 2006-251449 A | 9/2006 |

(Continued)

OTHER PUBLICATIONS

Nov. 6, 2018 International Search Report issued in International Patent Application No. PCT/JP2018/029645.

(Continued)

*Primary Examiner* — Mahidere S Sahle
(74) *Attorney, Agent, or Firm* — Oliff PLC

(57) ABSTRACT

A lightweight lens barrel that includes two focus lenses. The first lens holding frame for holding a first lens L5, a first drive unit STM5 for causing the first lens holding frame to move in the optical axis direction, a second lens holding frame for holding a second lens L6, and a second drive unit STM6 for causing the second lens holding frame to move in the optical axis direction, the first lens holding frame being arranged on an inner peripheral side of the second lens holding frame.

12 Claims, 17 Drawing Sheets

(56) References Cited

U.S. PATENT DOCUMENTS

| | | | |
|---|---|---|---|
| 2005/0168834 A1 | 8/2005 | Matsumoto et al. | |
| 2006/0203119 A1* | 9/2006 | Masuda | G03B 13/36 |
| | | | 348/347 |
| 2008/0158692 A1 | 7/2008 | Tomita et al. | |
| 2010/0214678 A1* | 8/2010 | Hino | G02B 7/102 |
| | | | 359/823 |
| 2011/0141340 A1 | 6/2011 | Yumiki et al. | |
| 2012/0262595 A1 | 10/2012 | Kishida et al. | |
| 2012/0281297 A1 | 11/2012 | Ohno | |
| 2014/0169779 A1 | 6/2014 | Araki | |
| 2014/0169781 A1 | 6/2014 | Araki et al. | |

FOREIGN PATENT DOCUMENTS

| | | |
|---|---|---|
| JP | 2008-164681 A | 7/2008 |
| JP | 2009-145516 A | 7/2009 |
| JP | 2013-090075 A | 5/2013 |
| JP | 2015-049334 A | 3/2015 |
| WO | 2008/139723 A1 | 11/2008 |
| WO | 2011/048752 A1 | 4/2011 |

OTHER PUBLICATIONS

May 27, 2021 Office Action issued in Chinese Patent Application No. 201880062052.8.

Sep. 16, 2021 Office Action issued in U.S. Appl. No. 16/648,492.

Oct. 22, 2021 Office Action issued in Chinese Patent Application No. 201880062052.8.

Nov. 2, 2021 Office Action issued in Japanese Patent Application No. 2019-544381.

May 6, 2022 Office Action issued in U.S. Appl. No. 16/648,492.

Aug. 1, 2022 Notice of Allowance issued in U.S. Appl. No. 16/648,492.

Mar. 28, 2023 Office Action issued in Japanese Patent Application No. 2022-122603.

Sep. 10, 2024 Office Action issued in Japanese Patent Application No. 2023-120041.

Mar. 11, 2025 Notice of Reasons for Refusal issued in Japanese Patent Application No. 2023-120041.

Sep. 30, 2025 Notice of Reasons for Refusal issued in Japanese Patent Application No. 2023-120041.

* cited by examiner

LENS BARREL AND IMAGING DEVICE

This is a Continuation of application Ser. No. 16/648,492 filed Mar. 18, 2020, which is a National Stage Application of PCT/JP2018/029645 filed Aug. 7, 2018, which in turn claims priority to Japanese Application No. 2017-191148 filed Sep. 29, 2017. The entire disclosures of the prior applications are hereby incorporated by reference herein in their entireties.

TECHNICAL FIELD

The present invention relates to a lens barrel and an imaging device.

BACKGROUND ART

Conventionally, a variety of devices provided with a focus lens and adopting a stepping motor as a drive mechanism of the focus lens have been proposed (for example, refer to Patent Document 1).

However, the stepping motor disclosed in J Patent Document 1 has a small driving force. Therefore, it is not possible to move a heavy focus lens in the optical axis direction.

Patent Document 1: Japanese Unexamined Patent Application, Publication No. 2015-49334

DISCLOSURE OF THE INVENTION

According to an aspect of the present invention, a lens barrel includes: a first lens holding frame that holds a first lens; a first driving unit that causes the first lens holding frame to move in an optical axis direction; a second lens holding frame that holds a second lens; and a second driving unit that causes the second lens holding frame to move in the optical axis direction, in which the first lens holding frame is arranged on an inner peripheral side of the second lens holding frame.

According to another aspect of the present invention, an imaging device includes the above-described lens barrel.

PREFERRED MODE FOR CARRYING OUT THE INVENTION

Figure 1:
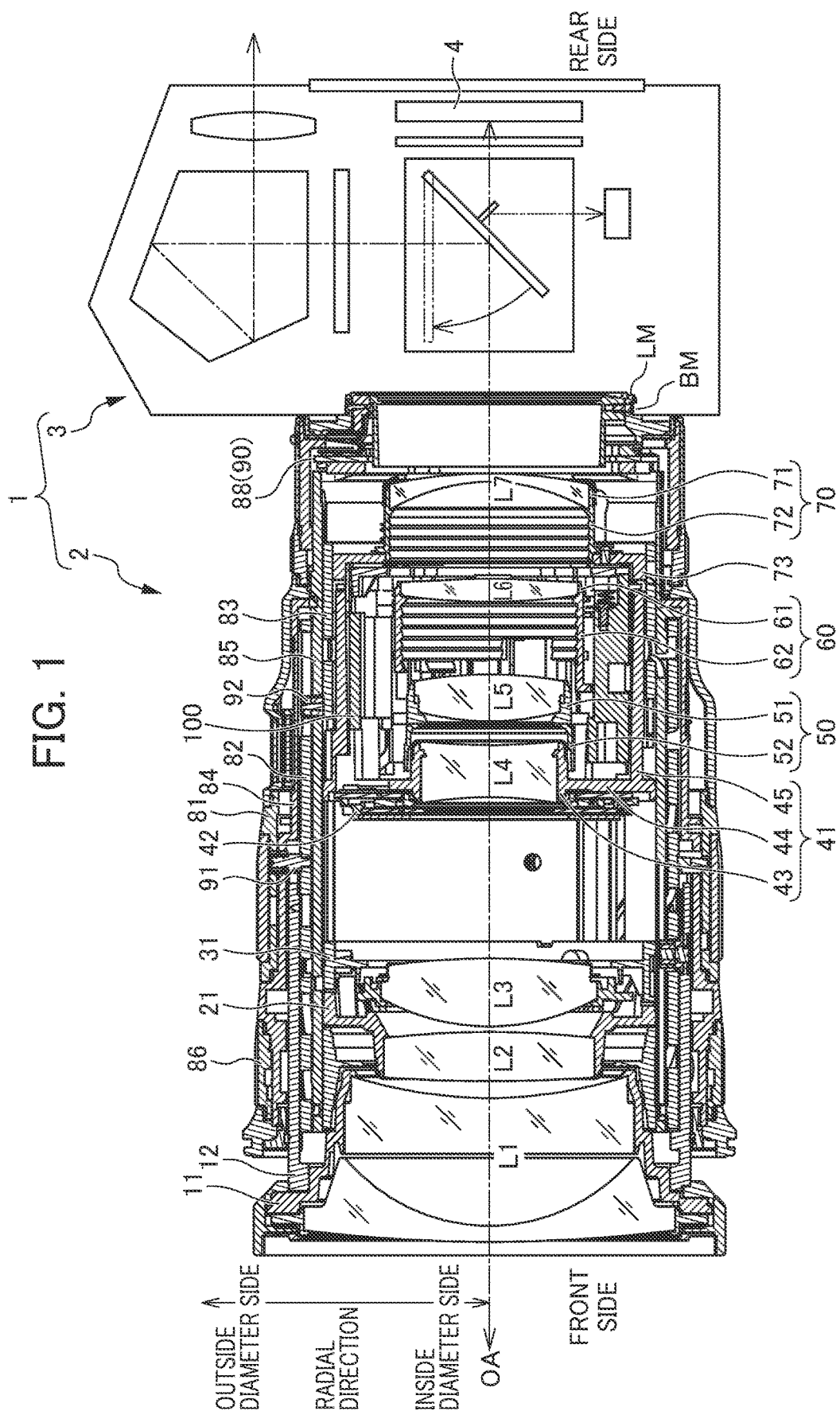
FIG. 1 is a conceptual diagram of a camera 1 configured by mounting a lens barrel to a camera body, which is an embodiment of the present invention.

FIG. 1 is a conceptual diagram of a camera 1 in which a lens barrel 2 of an embodiment of the present invention is mounted to a camera body 3. It should be noted that, in the following description, the subject side of the lens barrel 2 in the optical axis OA direction is a front side, and the camera body 3 side is a rear side. The movement in the optical axis OA direction of the lens barrel 2 is referred to as "moving straight", while the rotation around the optical axis OA is referred to as "rotation". Furthermore, in the radial direction perpendicular to the optical axis OA of the lens barrel 2, a side distancing from the optical axis OA is referred to as an outside diameter side, and a side approaching the optical axis OA is referred to as an inside diameter side.

The camera 1 includes the camera body 3 and the lens barrel 2. The lens barrel 2 includes a lens mount LM provided at the rear portion (proximal portion), and the lens mount LM is engaged with a body mount BM of the camera body 3, whereby the lens barrel 2 is detachably mounted to the camera body 3.

The camera body 3 includes an imaging device 4 for converting an optical image into an electrical signal. The camera body 3 is a so-called digital single-lens reflex camera. In the camera body 3, the imaged data captured by the imaging device 4 is image processed and recorded in a storage unit (not shown). It should be noted that the present invention is not limited to a digital single-lens reflex camera. It may be a mirrorless camera, or a compact digital camera. Furthermore, it may be a twin-lens camera. The camera may be built into a smartphone or tablet.

The camera body 3 is provided with a power switch (not shown). An ON/OFF signal of the power switch, or a signal indicating focusing or an aperture value is sent to a control unit 90 of the lens barrel 2 to be described later.

(1. Overview of Lens Barrel 2)

The lens barrel 2 includes a first lens unit L1, a second lens unit L2, a third lens unit L3, a fourth lens unit L4, a fifth lens unit L5, a sixth lens unit L6, and a seventh lens unit L7 from the front side, and is a so-called zoom lens in which the focal length is changeable. It should be noted that the present invention is not limited to the zoom lens, and a single focus lens may be adopted in which the focal length is not changeable.

(1-1. Each Lens Units L1 to L7)

The first lens unit L1, the second lens unit L2, the third lens unit L3, the fourth lens unit L4, the fifth lens unit L5, the sixth lens unit L6, and the seventh lens unit L7 move while zooming. Furthermore, the fifth lens unit L5 and the sixth lens unit L6 are each a focus lens unit that moves while focusing. The lens barrel 2 of the present embodiment includes two focus lens units. Therefore, it is possible to reduce the weight per focus lens unit, and it is possible even for an actuator having a small driving force such as a stepping motor to drive the focus lens unit. Furthermore, it is possible to improve focus performance.

The first lens unit L1 is held by a first unit frame 11, and a first unit sliding tube 12 extends toward the rear side from the first unit frame 11.

The second lens unit L2 is held by a second unit frame 21.

The third lens unit L3 is held by a third unit frame 31.

The fourth lens unit L4 is held by a fourth unit frame 41. The fourth unit frame 41 includes a fourth unit holding portion 43 for holding the outer circumference of the fourth lens unit L4, a front wall portion 44 extending toward the outside diameter side from the fourth unit holding portion 43, and a tube portion 45 extending from an end of the outside diameter side of the front wall portion 44 toward the rear side.

An aperture unit 42 is attached to the front side of the fourth unit frame 41.

The fifth lens unit L5 is held by the fifth unit frame 50. The fifth unit frame 50 includes a fifth unit holding portion 51 covering the outer circumference of the fifth lens unit L5, and a fifth unit hood portion 52 extending toward the front side from the fifth unit holding portion 51. The fifth unit hood portion 52 may extend toward the rear side. The fifth unit hood portion 52 is provided in order to prevent ghosting due to incidence or the like of unwanted light. In place of the fifth unit hood portion 52, a tube portion 52 may be adopted.

The sixth lens unit L6 is held by the sixth unit frame 60. The sixth unit frame 60 includes a sixth unit holding portion 61 covering the outer circumference of the sixth lens unit L6, and a sixth unit hood portion 62 extending toward the front side from the sixth unit holding portion 61. The sixth unit hood portion 62 may extend toward the rear side. The sixth unit hood portion 62 is provided in order to prevent ghosting due to incidence or the like of unwanted light. In place of the sixth unit hood portion 62, a tube portion 62 may be adopted.

The fifth unit frame 50 and the sixth unit frame 60 are arranged on the inside diameter side of a motor sliding tube 100. The motor sliding tube 100 is arranged in the tube portion 45 of the fourth unit frame 41. The motor sliding tube 100 is driven in the optical axis OA direction while zooming. Furthermore, at the time of zooming and focusing, the fifth unit frame 50 is driven in the optical axis OA direction by a fifth unit motor (for example, a stepping motor. Hereinafter, referred to as an STM 5) to be described later which is fixed to the motor sliding tube 100, and the sixth unit frame 60 is driven in the direction of the optical axis OA by a sixth unit motor (hereinafter referred to as an STM 6). It should be noted that the motor is not limited to a stepping motor, and may be a DC motor, a voice coil motor, an ultrasonic motor or the like.

The seventh lens unit L7 is held by the seventh unit frame 70. The seventh unit frame 70 includes a seventh unit holding portion 71 covering the outer circumference of the seventh lens unit L7, and a seventh unit hood portion 72 extending toward the front side from the seventh unit holding portion 71. The seventh unit hood portion 72 may extend toward the rear side. The seventh unit sliding tube 73 is attached to the front end of the seventh unit frame 70. The seventh unit hood portion 72 is provided in order to prevent ghosting due to incidence or the like of unwanted light. It should be noted that a tube portion 72 may be adopted in place of the seventh unit hood portion 72.

The first lens unit L1, the second lens unit L2, the third lens unit L3, the fourth lens unit L4, the fifth lens unit L5, the sixth lens unit L6, and the seventh lens unit L7 are driven in the optical axis OA direction by the rotation of an outer cam tube 82 and an inner cam tube 83, which are rotated by the rotation of a zoom ring 81, which will be described later.

(1-2. Mechanical Configuration)

The lens barrel 2 includes an outer fixed tube 84 and an inner fixed tube 85. A zoom ring 81 and a focus ring 86 are provided in a rotatable manner, respectively, at the outer circumference of the outer fixed tube 84. A ring for aperture may be provided.

The first unit sliding tube 12 and the outer cam tube 82 are arranged between the outer fixed tube 84 and the inner fixed tube 85 from the outside diameter side.

The second unit frame 21, the third unit frame 31, the fourth unit frame 41, the motor sliding tube 100, and the seventh unit frame 70 are arranged on the inside diameter side of the inner fixed tube 85. The fifth unit frame 50 and the sixth unit frame 60 are arranged on the inside diameter side of the motor sliding tube 100. Furthermore, the motor sliding tube 100 is arranged on the inside diameter side of the fourth unit frame 41.

The rear side of the tube portion 45 of the fourth unit frame 41 has a smaller diameter than the front side, and the inner cam tube 83 is arranged between the small diameter portion and the inner fixed tube 85.

(1-2-1. Outer Cam Tube 82, Inner Cam Tube 83, Outer Fixed Tube 84, and Inner Fixed Tube 85)

A first connecting pin 91 extends toward the inside diameter side from the zoom ring 81.

The first connecting pin 91 penetrates a circumferential groove provided in the outer fixed tube 84, and is connected to the outer cam tube 82. When rotating the zoom ring 81 in the circumferential direction, the first connecting pin 91 also rotates in the circumferential direction, and the outer cam tube 82 rotates together with the zoom ring 81.

A second connecting pin 92 extends toward the outside diameter side from the inner cam tube 83. The second connecting pin 92 penetrates a cam groove for cam drive provided in the inner fixed tube 85, and is inserted into a straight groove provided in the outer cam tube 82. When the outer cam tube 82 is rotated in the circumferential direction, the second connecting pin 92 is also rotated in the circumferential direction, and the inner cam tube 83 rotates and advances.

Four types of cam grooves are provided at the outer cam tube 82, and respectively drive the first unit sliding tube 12, the second unit frame 21, the third unit frame 31, and the fourth unit frame 41.

A cam groove for driving the seventh unit sliding tube 73 and a circumferential groove for driving the motor sliding tube 100 are provided at the inner cam tube 83. In other words, the movement amount of the inner cam tube 83 and the movement amount of the motor sliding tube 100 are the same. It should be noted that the movement amount of the inner cam tube 83 may differ from the movement amount of the motor sliding tube 100 by providing a cam groove for driving the motor sliding tube 100.

A straight groove is provided at the outer fixed tube 84 which guides the first unit sliding tube 12 to move straight.

Three types of straight grooves are provided at the inner fixed tube 85 which respectively guide the second unit frame 21, the third unit frame 31, and the fourth unit frame 41 to move straight. Furthermore, a cam groove for driving the seventh unit sliding tube 73 is provided. Furthermore, as described above, the cam groove of the inner cam tube 83 is provided.

For the fourth unit frame 41, a straight groove which guides the motor sliding tube 100 to move straight is provided.

(1-2-2. Mechanical Drive of Each Lens Unit)

The first unit sliding tube 12 moves straight in the optical axis OA direction by the cam groove of the outer cam tube 82 and the straight groove of the outer fixed tube 84 without rotating.

The second unit frame 21, the third unit frame 31, and the fourth unit frame 41 move straight in the optical axis OA direction by the cam groove of the outer cam tube 82 and the straight groove of the inner fixed tube 85 without rotating. In other words, they are guided to move straight by the straight groove of the inner fixed tube 85 while being driven in the optical axis OA direction by the cam groove of the rotating outer cam tube 82.

The motor sliding tube 100 moves straight in the optical axis OA direction without rotating by a circumferential groove of the inner cam tube 83 and the straight groove of the fourth unit frame 41.

The seventh unit sliding tube 73 moves straight in the direction of the optical axis OA by the cam groove of the inner cam tube 83 and the cam groove of the inner fixed tube 85 which rotate and move straight without rotating.

(1-3. Configuration of Focus Mechanism Part)

(1-3-1. Mechanical Drive of the Motor Sliding Tube 100)

Figure 2:
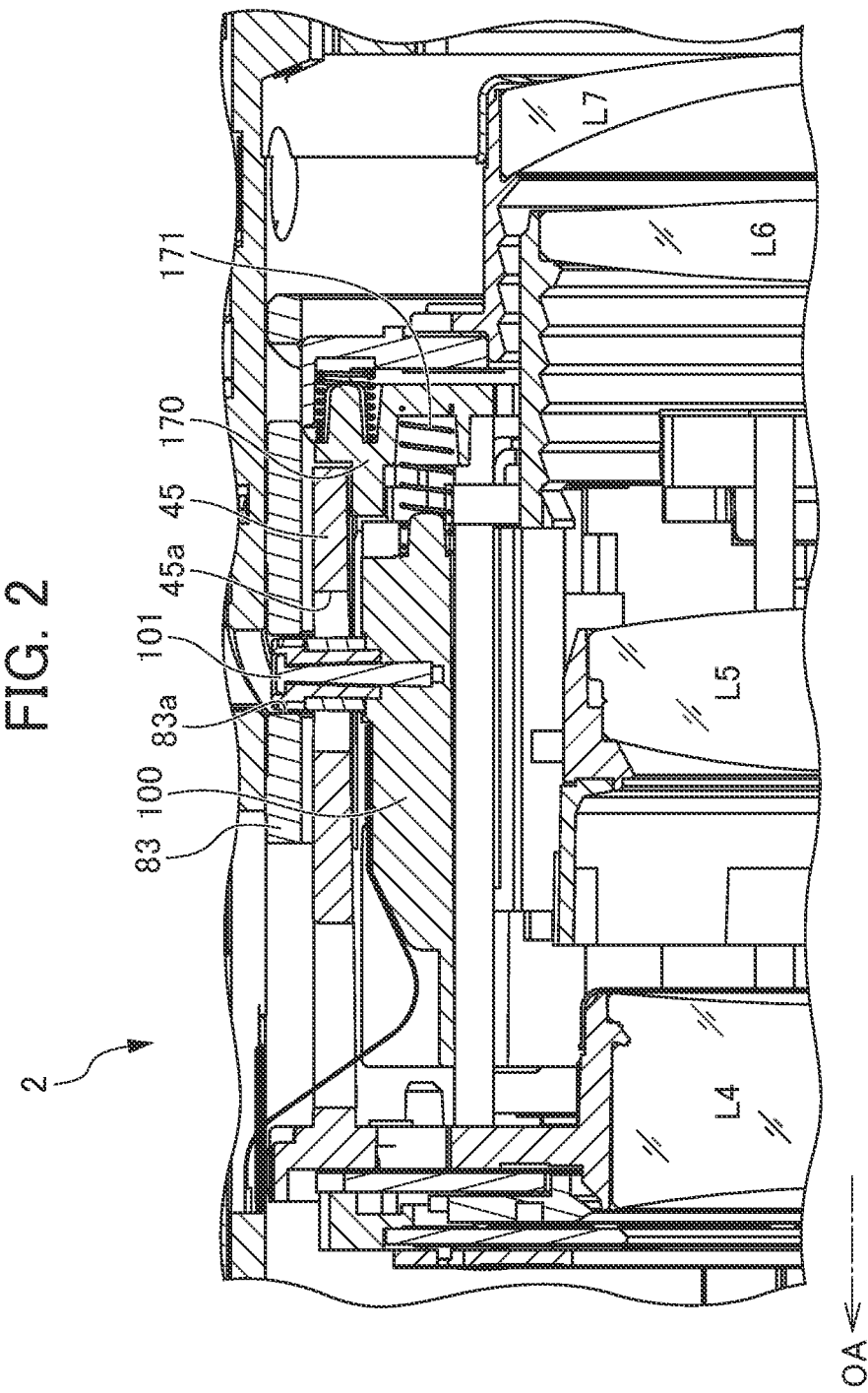
FIG. 2 is a partial cross-sectional view of the lens barrel.

FIG. 2 is a partial cross-sectional view of the lens barrel 2. It should be noted that FIG. 2 state is differs from FIG. 1 in the position and angle of each lens unit. As shown, the motor sliding tube 100 is arranged on the inside diameter side of the fourth unit frame 41 (the tube portion 45).

As described above, when the zoom ring 81 is rotated, the outer cam tube 82 is also rotated by the first connecting pin 91. The outer cam tube 82 is engaged with the inner cam tube 83 by the second connecting pin 92 which penetrates the cam groove of the inner fixed tube 85. Therefore, when the outer cam tube 82 rotates, the inner cam tube 83 moves straight while rotating.

A cam pin 101 extends from the motor sliding tube 100 toward the outside diameter side. The cam pin 101 penetrates a straight groove 45a provided in the tube portion 45 of the fourth unit frame 41, and is engaged with a circumferential groove 83a provided in the inner cam tube 83.

Therefore, when the inner cam tube 83 moves straight while rotating, the motor sliding tube 100 moves in the straight direction with the straight component of movement of the inner cam tube 83, while being guided to move straight by the straight groove 45a provided in the tube portion 45 by the cam pin 101. Therefore, when the zoom ring 81 rotates, the motor sliding tube 100 moves straight without rotating. Therefore, the fifth lens unit L5 and the sixth lens unit L6 move straight.

Furthermore, the STM 5 and STM 6 are fixed to the motor sliding tube 100. On the basis of the rotation of the zoom ring 81 or the focus ring 86, the STM 5 drives the fifth lens unit L5 in the optical axis direction, and the STM 6 drives the sixth lens unit L6 in the optical axis direction. In other words, the fifth lens unit L5 (the fifth unit frame 50) and the sixth lens unit L6 (the sixth unit frame 60) respectively move in the optical axis direction with respect to the motor sliding tube 100. The lens driving by the STM 5 and the STM 6 will be described later.

Figure 5:
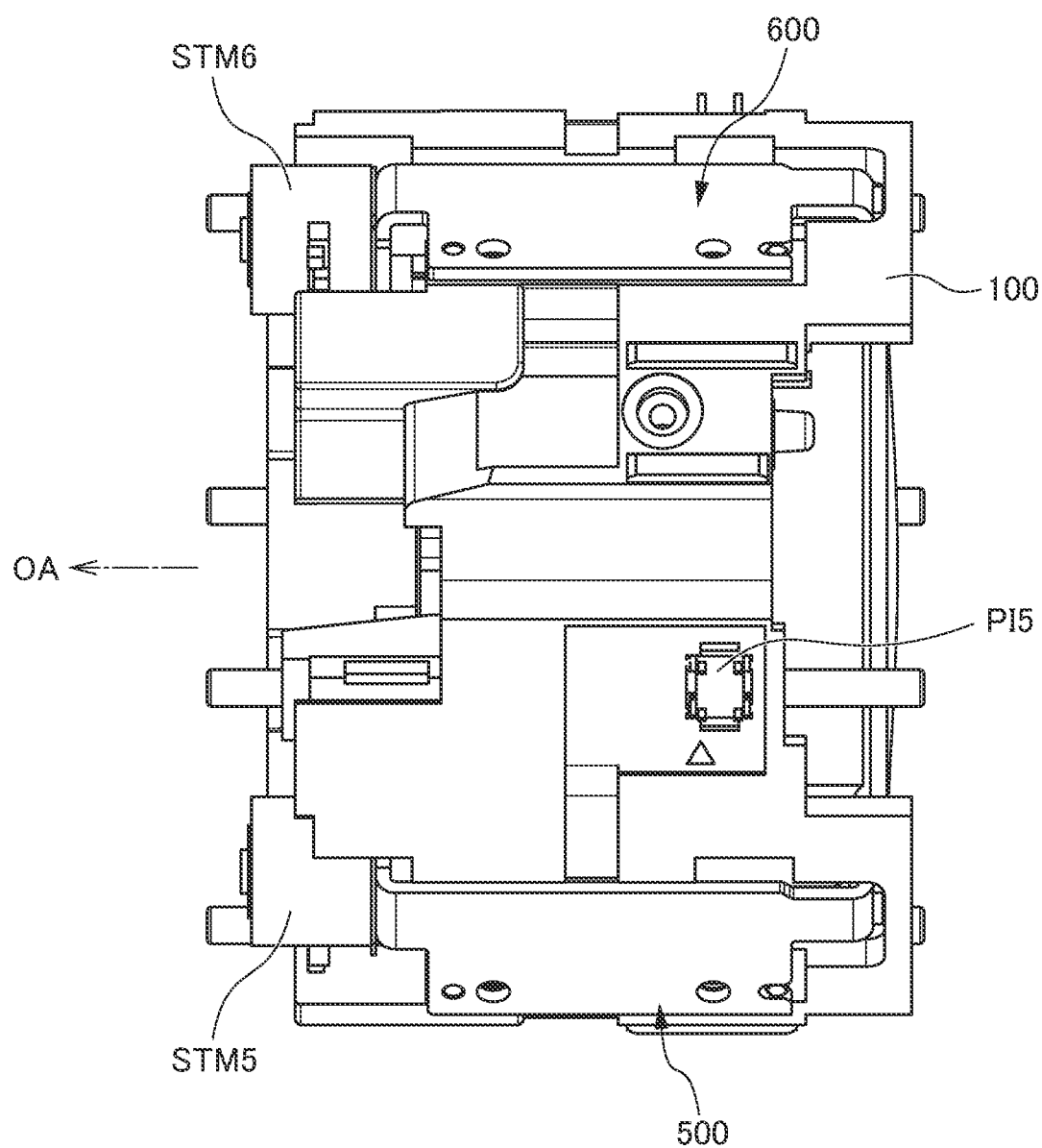
FIG. 5 is a side view of a motor sliding tube and a part located on an inside diameter side portion from the motor sliding tube.
Figure 6:
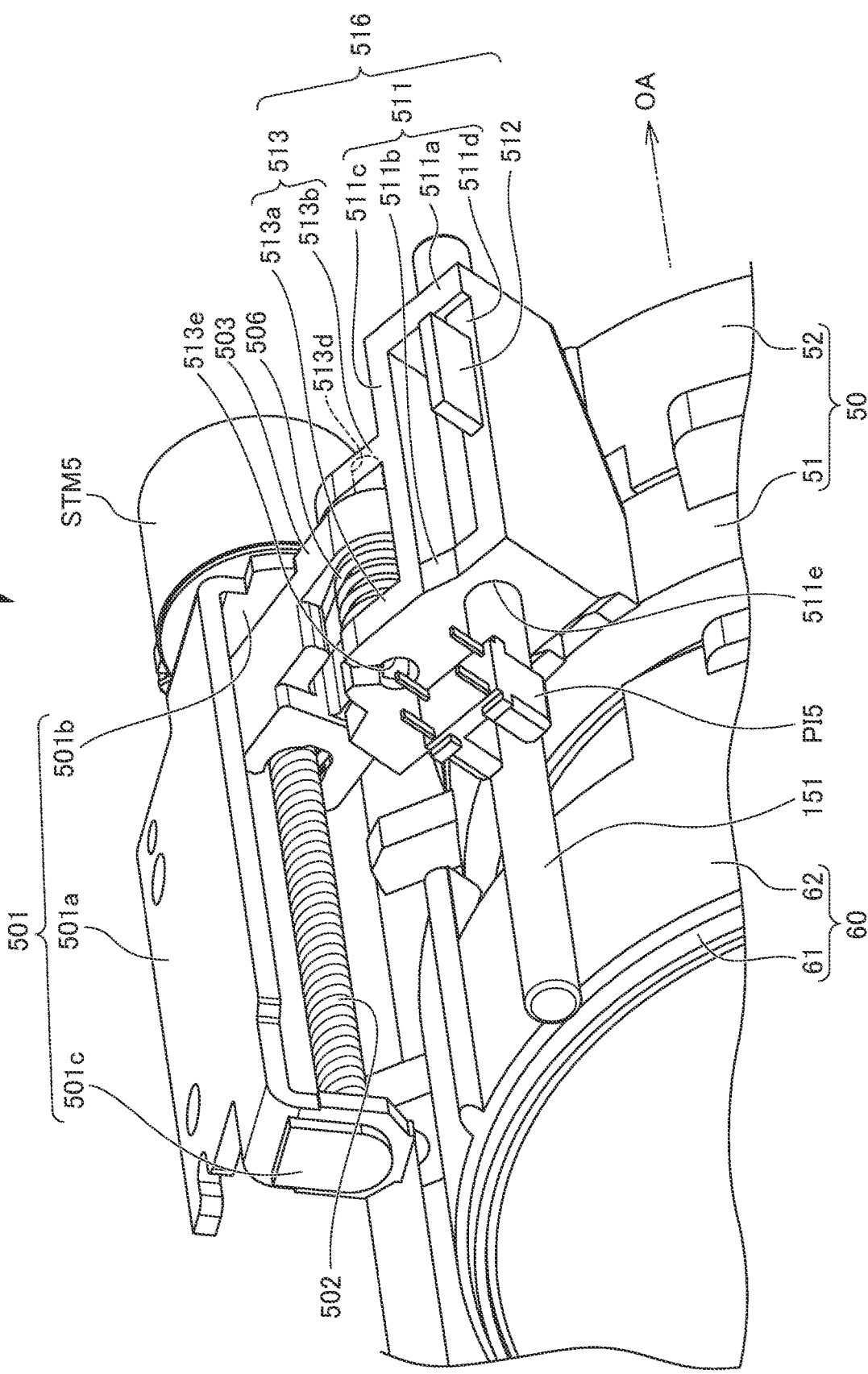
FIG. 6 is a perspective view showing a fifth lens unit driving unit.

FIG. 5 is a side view of the motor sliding tube 100 and a part located on an inside diameter side portion from the motor sliding tube 100. A fifth lens unit driving unit 500 for driving the fifth lens unit L5 and a sixth lens unit driving unit 600 for driving the sixth lens unit L6 are fixed by screws to the motor sliding tube 100 (screws in the drawing are not shown). FIG. 6 is a perspective view showing the fifth lens unit driving unit 500.

The fifth lens unit driving unit 500 including the STM 5 for driving the fifth lens unit L5 which is a focus lens, and the sixth lens unit driving unit 600 including the STM 6 for driving the sixth lens unit L6 which is a focus lens are attached to the motor sliding tube 100.

(1-3-2. Drive Control of L5 and L6 by Lens Driving Unit)

Figure 3:
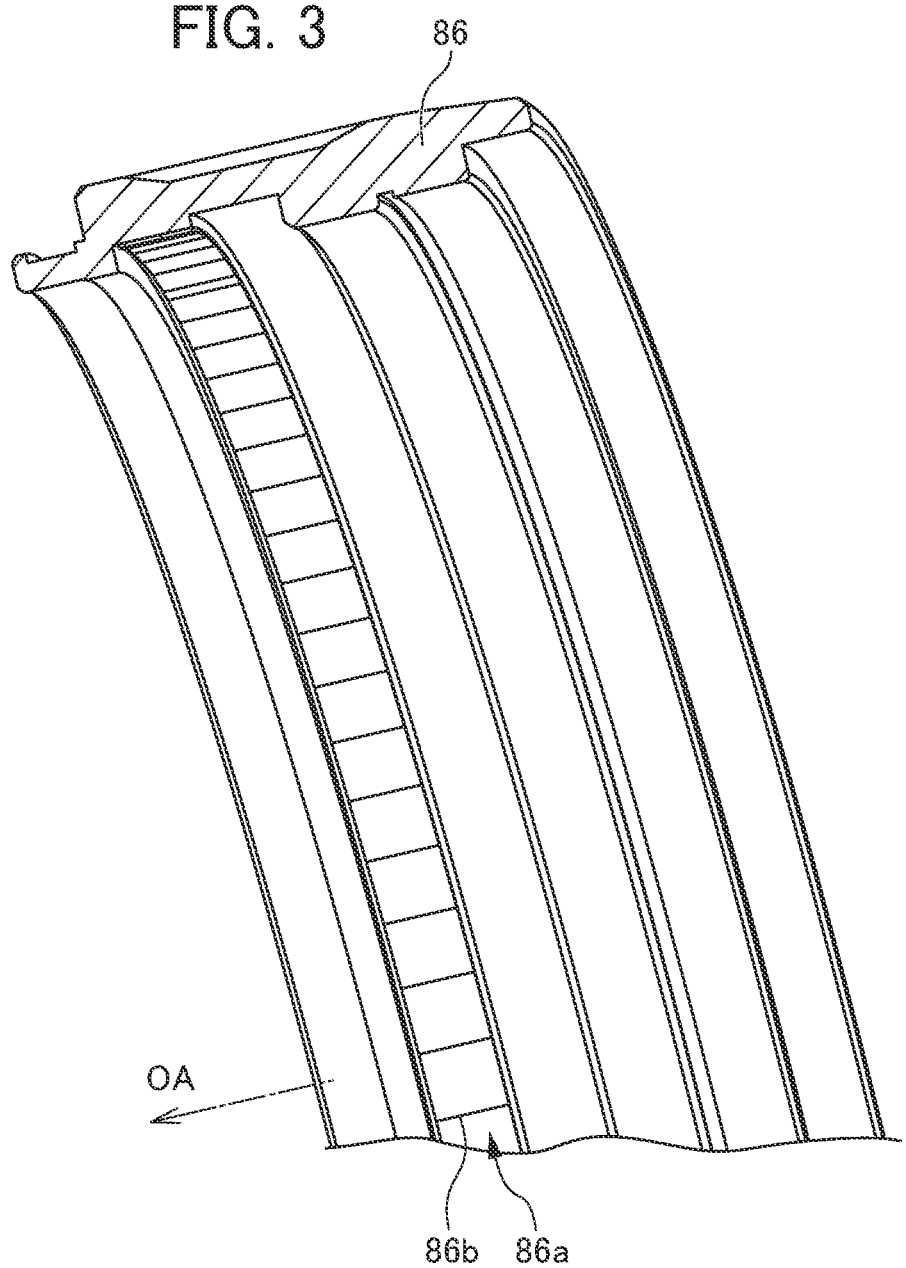
FIG. 3 is a view of a part of a focus ring seen from an inside diameter side.
Figure 4:
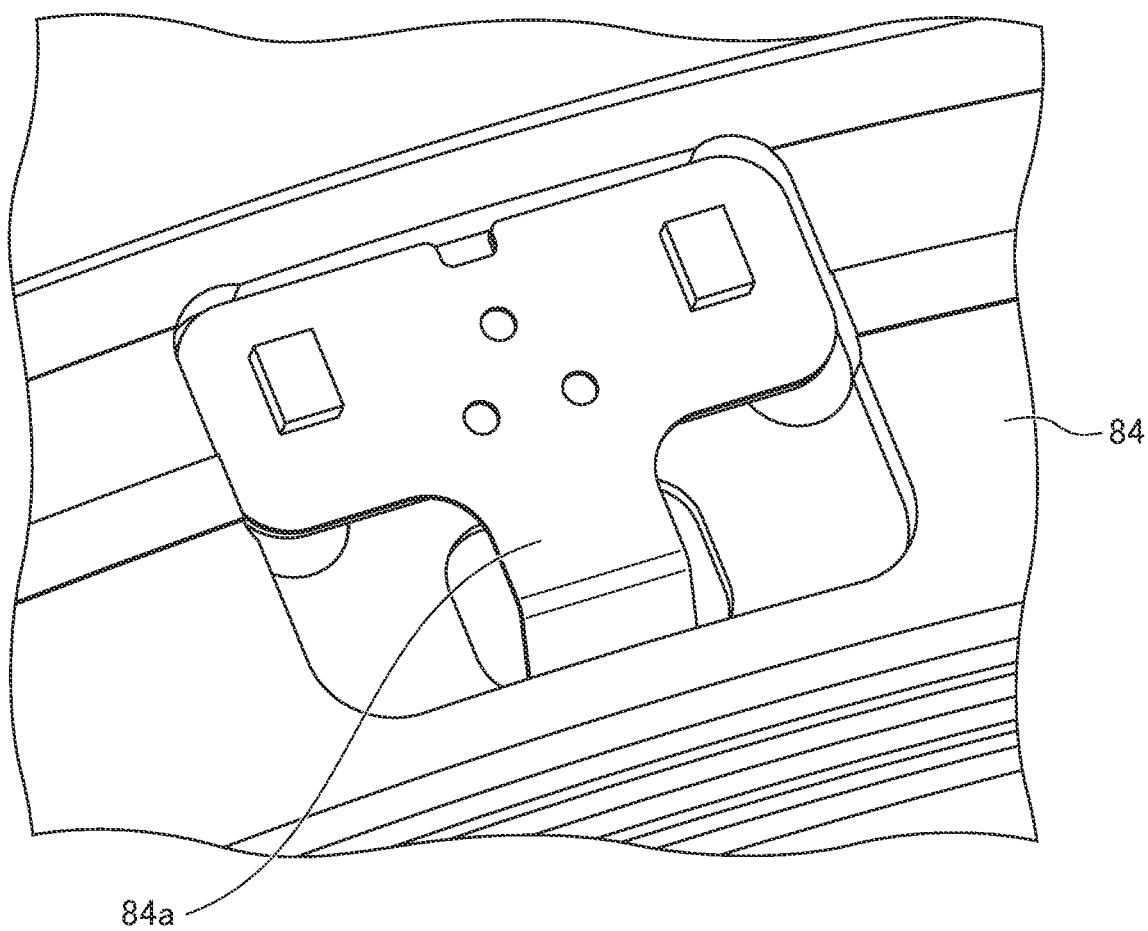
FIG. 4 is a view of a part of an outer fixed tube viewed from an outside diameter side.

FIG. 3 is a view of a portion of the focus ring 86 as viewed from the inside diameter side. FIG. 4 is a view of a portion of the outer fixed tube 84 as viewed from the outside diameter side.

As shown in FIG. 3, a reflective tape 86a is attached on the inside diameter side of the focus ring 86 in the circumferential direction. A light shielding line 86b extending in the optical axis OA direction is formed on the reflective tape 86a.

As shown in FIG. 4, a photo interrupter 84a for detecting the rotation of the focus ring 86 is attached on the outside diameter side of the outer fixed tube 84 located on the inner peripheral side of the focus ring 86.

When the focus ring 86 is rotated, the reflective tape 86a also rotates. The photo interrupter 84a detects a light shielding pulse generated by the light shielding line 86b of the reflective tape 86a. The number of light shielding pulses corresponds to the rotation amount of the focus ring 86.

As shown in FIG. 1, a main board 88 is attached by screws at the end of the rear side of the inner fixed tube 85. An FPC (not shown) extends from the photo interrupter 84a to the main board 88. The main board 88 has a control unit 90, and a light shielding pulse signal corresponding to the rotation amount of the focus ring 86 is inputted from the photo interrupter 84a to the control unit 90 via the FPC. With the above configuration, it is possible to detect the rotation amount of the focus ring 86.

When the focus ring 86 rotates, the photo interrupter 84a detects the rotation amount and sends a signal to the control unit 90 of the main board 88. Furthermore, through the focusing operation by the release half-press or the like by a photographer, a signal is sent from the camera body 3 to the control unit 90 of the main board 88.

Then, a pulse is transmitted from the control unit 90 to the STM 5, and the STM 5 is driven. When the STM 5 is driven, the lead screw 502 is rotated. This allows the fifth lens unit L5 to move. It should be noted that the same applies to the driving of the sixth lens unit L6.

Furthermore, a rotation detecting unit (not shown) for detecting the rotation amount of the zoom ring 81 is provided on the inside diameter side of the zoom ring 81.

Examples thereof include a potentiometer. The FPC extends from the potentiometer to the main board 88. The control unit 90 can determine the rotation amount of the zoom ring 81 by the detection value from the potentiometer.

When the rotation of the zoom ring 81 is detected by the potentiometer, the control unit 90 drives the STM 5 at a drive amount corresponding to the rotation amount of the zoom ring 81. When the STM 5 is driven, the fifth lens unit L5 moves in the optical axis OA direction. The same applies to the sixth lens unit L6.

It should be noted that the potentiometer may be used for the rotation detection of the focus ring, and the reflective tape and the photo interrupter may be used for the rotation detection of the zoom ring. Other detection means such as magnetic detection may be used.

(1-3-3. Details of Lens Driving Unit)

Next, a description will be given of the fifth lens unit driving unit 500. Since the sixth lens unit driving unit 600 has the same configuration as the fifth lens unit driving unit 500, the description therefor will be omitted.

As shown in FIG. 6, the fifth lens unit driving unit 500 includes a unit frame 501 which is threaded to the motor sliding tube 100, the STM 5 fixed to the front end of the unit frame 501, a lead screw 502 that extends from the STM 5 toward the rear side in the optical axis OA direction and is rotatably held by the unit frame 501, and a moving rack 503 which is engaged with the lead screw 502 and moves in the optical axis OA direction by the rotation of the lead screw 502. It should be noted that the STM 5 may be fixed to the rear end of the unit frame 501. In such a case, the lead screw 502 extends from the STM 5 toward the front side in the optical axis OA direction. It should be noted that the lead screw 602 extending from the STM 6 may extend in a direction similar to the lead screw 502, or may extend in the opposite direction. That is, in a case in which the lead screw 502 extends toward the rear side in the optical axis OA direction, the lead screw 602 extends toward the rear side in the optical axis OA direction. In such a case, the relationship between the driving direction of the STM 5 and the moving direction of the fifth lens unit L5 can be the same as the relationship between the driving direction of the STM 6 and the moving direction of the sixth lens unit L6. Alternatively, in a case in which the lead screw 502 extends toward the rear side in the optical axis OA direction, the lead screw 602 may extend toward the front side in the optical axis OA direction. In such a case, it is possible to make the lens barrel thin in the optical axis direction.

(Unit Frame 501)

The unit frame 501 includes a plate-shaped unit fixing portion 501a that extends in the optical axis OA direction, an STM fixing portion 501b that is bent substantially at a right angle in the inner radial direction from the unit fixing portion 501a at the front end of the unit fixing portion 501a, and a lead screw holding portion 501c that is bent substantially at a right angle in the inner radial direction from the unit fixing portion 501a at the rear end of the unit fixing portion 501a.

As shown in FIG. 5 described above, the unit fixing portion 501a is arranged on the outer circumference of the motor sliding tube 100, and is threaded to the motor sliding tube 100.

The STM 5 is fixed to the STM fixing portion 501b, and the rear end side of the lead screw 502 is rotatably held at the lead screw holding portion 501c.

(STM 5)

The FPC extending from the main board 88 (not shown) is connected to the STM 5.

(Lead Screw 502)

The lead screw 502 is rotatably driven by the rotational force of the STM 5. The outer circumference of the lead screw 502 is threaded.

(Moving Rack 503)

Figure 7:
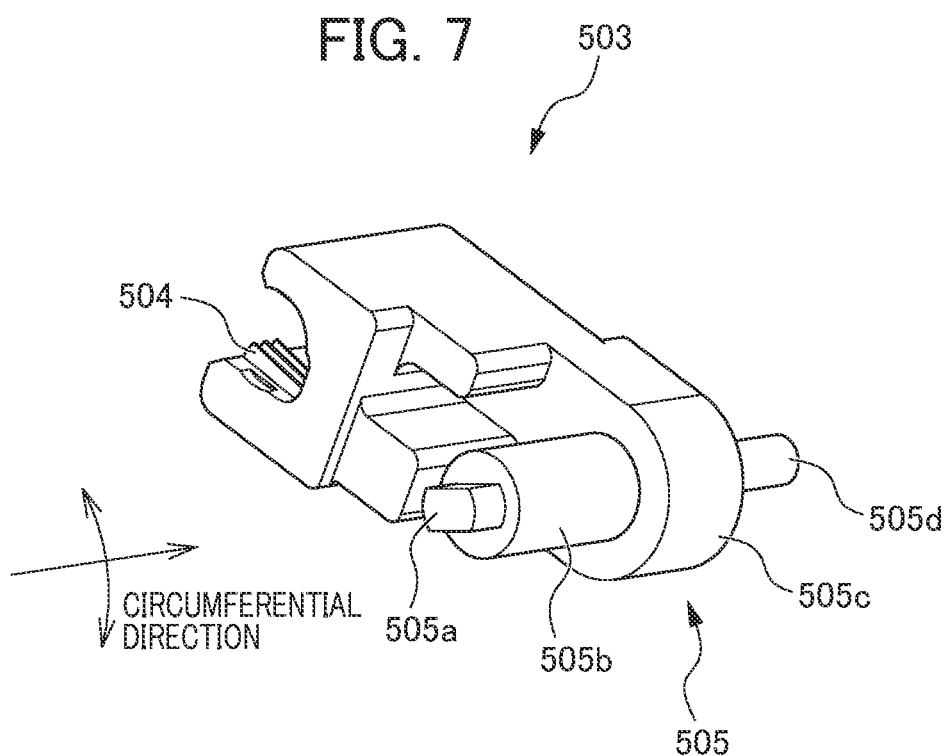
FIG. 7 is a perspective view showing a portion of a moving rack shown in FIG. 6.

FIG. 7 is a perspective view showing only a portion of the moving rack 503 in FIG. 6. The moving rack 503 includes a gearing portion 504 and an engaging shaft portion 505. The gearing portion 504 has a U-shaped cross section in the radial direction, and the gearing portion 504 for gearing with the threaded portion of the lead screw 502 is provided on the inner surface of the U-shaped portion into which the lead screw 502 is inserted.

The engaging shaft portion 505 is provided on the opposite side of the lens barrel 2 in the circumferential direction with respect to the portion where the gearing portion 504 in the moving rack 503 is provided.

The engaging shaft portion 505 is a columnar member extending in the optical axis OA direction, and has portions having different diameters at a rear small diameter portion 505a, a middle diameter portion 505b, a large diameter portion 505c, and a front small diameter portion 505d in this order from the rear side in the present embodiment.

(1-3-4. Details of Lens Unit Frame)

As shown in FIG. 6, etc., a protrusion 510 extending toward the outside diameter in the radial direction from the outer circumference of the portion covering the outer circumference of the fifth lens unit L5 is provided at the fifth unit frame 50. The protrusion 510 includes a main guide bar engaging portion 511, a light shielding portion 512 (in a case of the sixth unit frame, a light shielding portion 612), and a rack engaging portion 513 (a straight driving unit).

It should be noted that the protrusion 510 is for the fifth lens unit L5 driving corresponding to the fifth lens unit driving unit 500. A similar protrusion 610 for driving the sixth lens unit L6 (shown in FIG. 8 to be described later) is provided. Since it has the same configuration as the protrusion 510 for driving the fifth lens unit L5, a description thereof will be omitted.

(Main Guide Bar Engaging Portion 511)

The main guide bar engaging portion 511 includes a front wall 511a, a rear wall 511b provided in parallel with and in a spaced manner from the front wall 511a, and two side walls 511c and 511d connecting the front wall 511a and the rear wall 511b. The front wall 511a and the rear wall 511b are each provided with a guide bar insertion hole 511e through which a main guide bar 151 to be described later slidably penetrates.

Figure 8:
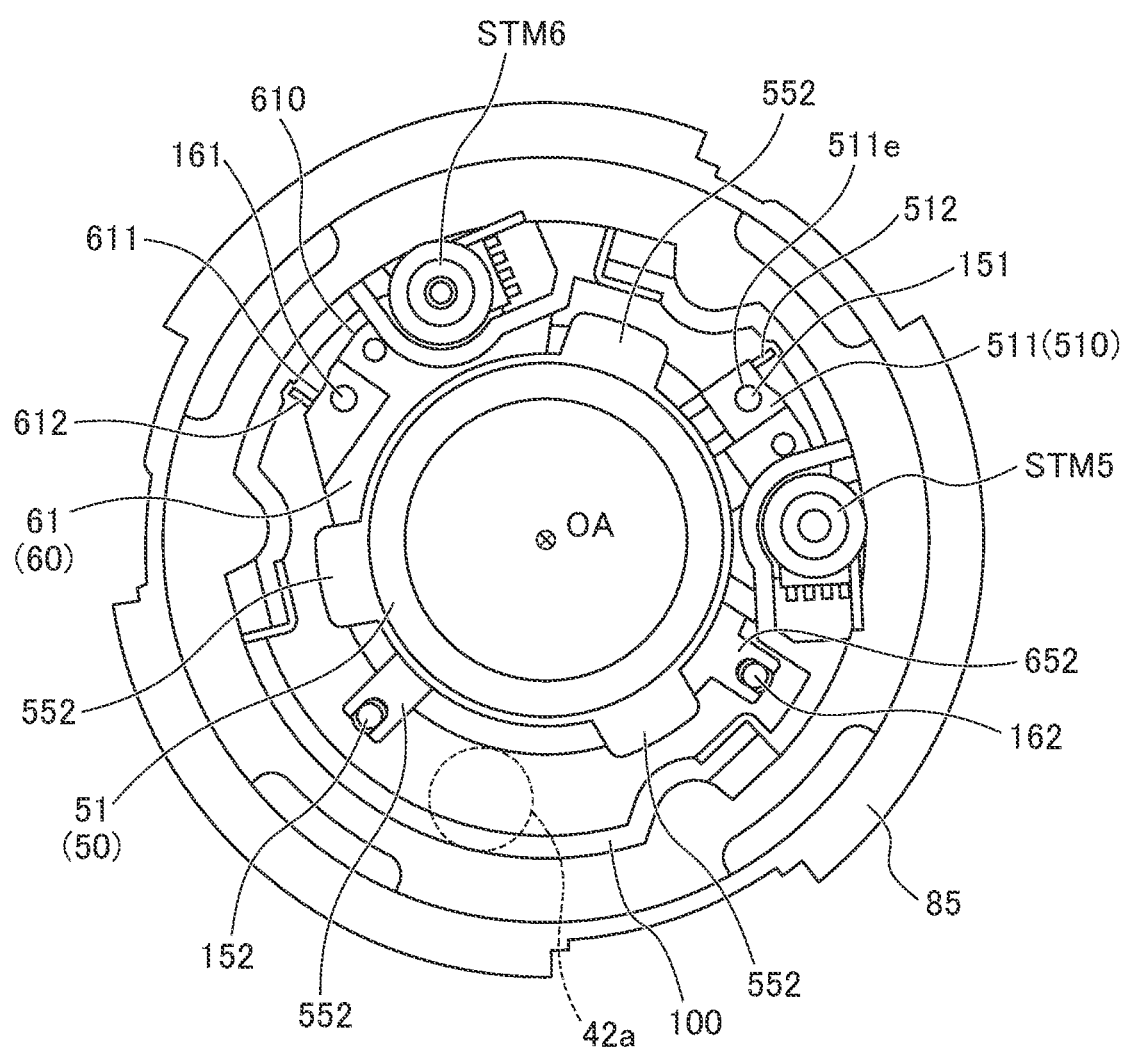
FIG. 8 is a cross-sectional view in a radial direction in which an inner fixed tube, a motor sliding tube, a fifth unit tube, a sixth unit tube, an STM 5, and an STM 6 are viewed from a rear side.

FIG. 8 is a cross-sectional view in the radial direction of the inner fixed tube 85, the motor sliding tube 100, the fifth unit holding portion 51, the sixth unit holding portion 61, the STM 5, and the STM 6 as viewed from the front side.

As described above with reference to FIG. 6, the protrusion 510 extending from the outer circumference of the fifth unit holding portion 51 toward the outside diameter side is provided. The protrusion 510 includes a main guide bar engaging portion 511. Furthermore, a sub-guide bar engaging portion 552 extending in the radial direction from the outer circumference is provided at the fifth unit holding portion 51. The sub-guide bar engaging portion 552 is provided at a position of approximately 180 degrees with respect to the main guide bar 151 of the protrusion 510.

As described above, the main guide bar engaging portion 511 includes the front wall 511a and the rear wall 511b which are in parallel with and in a spaced manner from each other, and the main guide bar 151 is inserted into the guide bar insertion hole 511e provided for them (it should be noted that, in the description to be provided later, the distance from the front end of the front wall 511a to the rear end of the rear wall 511b is referred to as engagement length). By the main guide bar 151, the fifth unit holding portion 51 is guided in the optical axis OA direction.

The sub-guide bar engaging portion 552 is a member having a U-shaped groove with the outside diameter side open. The sub-guide bar 152 is inserted into the U-shaped groove. Thus, since the U-shaped groove of the sub-guide bar engaging portion 552 is engaged with the sub-guide bar 152, the rotation in the circumferential direction around the main guide bar 151 is prevented.

It should be noted that, similarly to the sixth unit frame 60, the sub-guide bar engaging portion 652 extends toward the outside diameter side at a position of approximately 180 degrees with respect to the protrusion 610 at which the main guide bar engaging portion 611 at the lens holding portion is provided.

(Light Shielding Portion 512)

The light shielding portion 512 is provided to protrude toward the outside diameter side from the side wall 511d. The light shielding portion 512 is a rectangular plate-shaped portion extending a predetermined distance in the optical axis OA direction. It should be noted that the light shielding portion 512 may be provided on the side wall 511c. The light shielding portion 512 is a member for shielding a PI5 provided in the motor sliding tube. It is possible to detect the position of the fifth lens unit L5 by the light shielding portion 512 and the PI5.

(Rack Engaging Portion 513)

The rack engaging portion 513 extends from the side wall 511c toward the fifth lens unit driving unit 500 side.

The rack engaging portion 513 includes a front arm 513a, and a rear arm 513b provided in parallel with and in a spaced manner from the front arm 513a. The rear arm 513b extends continuously from the rear wall 511b toward the fifth lens unit driving unit 500 side, and the front arm 513a extends toward the fifth lens unit driving unit 500 side from a position closer to the rear wall 511b than the front wall 511a of the other side wall 511c.

Through holes 513d and 513e are respectively provided in the front arm 513a and the rear arm 513b. The through hole 513d of the front arm 513a is a circular through hole. The through hole 513e of the rear arm 513b is a circular through hole, and a cut out portion is provided in the radial direction of the through hole.

The engaging shaft portion 505 is arranged between the front arm 513a and the rear arm 513b.

The through holes 513d and 513e each have a larger diameter than a rear small diameter portion 505a and a front small diameter portion 505d of the engaging shaft portion 505. Furthermore, the through holes 513d and 513e each have a smaller diameter than the middle diameter portion 505b and the large diameter portion 505c of the engaging shaft portion 505.

The front small diameter portion 505d of the engaging shaft portion 505 is inserted into the through hole 513d of the front arm 513a. The rear small diameter portion 505a of the engaging shaft portion 505 is inserted into the through hole 513e of the rear arm 513b. At this time, since the cut out portion is provided in the through hole 513e, the rear small diameter portion 505a can be put into the through hole 513e laterally from the cut out portion after the front small diameter portion 505d is inserted into the through hole 513d of the front arm 513a.

(Coil Spring 506)

Due to manufacturing errors, deflection of the front arm 513a and the rear arm 513b, or the like, a gap is produced between the front arm 513a and the rear arm 513b, or a gap is produced between a side surface of the small diameter portion 505a of the middle diameter portion 505b and a side surface on the middle diameter portion 505b side of the large diameter portion 505c, and a side surface of the front arm 513a and the rear arm 513b when the middle diameter portion 505b and the large diameter portion 505c of the engaging shaft portion 505 is arranged, whereby it is conceivable that the engaging shaft portion 505 rattles with respect to the rack engaging portion 513.

Therefore, the coil spring 506 is arranged on the outer circumference of the middle diameter portion 505b. The diameter of the coil spring 506 has a larger diameter than the small diameter portion 505a and the middle diameter portion 505b, and has a smaller diameter than the large diameter portion 505c. The coil spring 506 is arranged between the rear arm 513b and the large diameter portion 505c, and energizes the rear arm 513b (i.e., the fifth unit frame 50) toward the rear side in the optical axis OA direction.

By driving the STM 5, when the lead screw 502 is rotated, the moving rack 503 moves in the optical axis OA (the direction along the optical axis OA) by gearing of the gearing portion 504 of the moving rack 503 with the screw portion of the lead screw 502.

Furthermore, since the coil spring 506 also causes a energizing force in the circumferential direction, it is possible to energize the fifth unit frame 50 in the circumferential direction as well.

Figure 9:
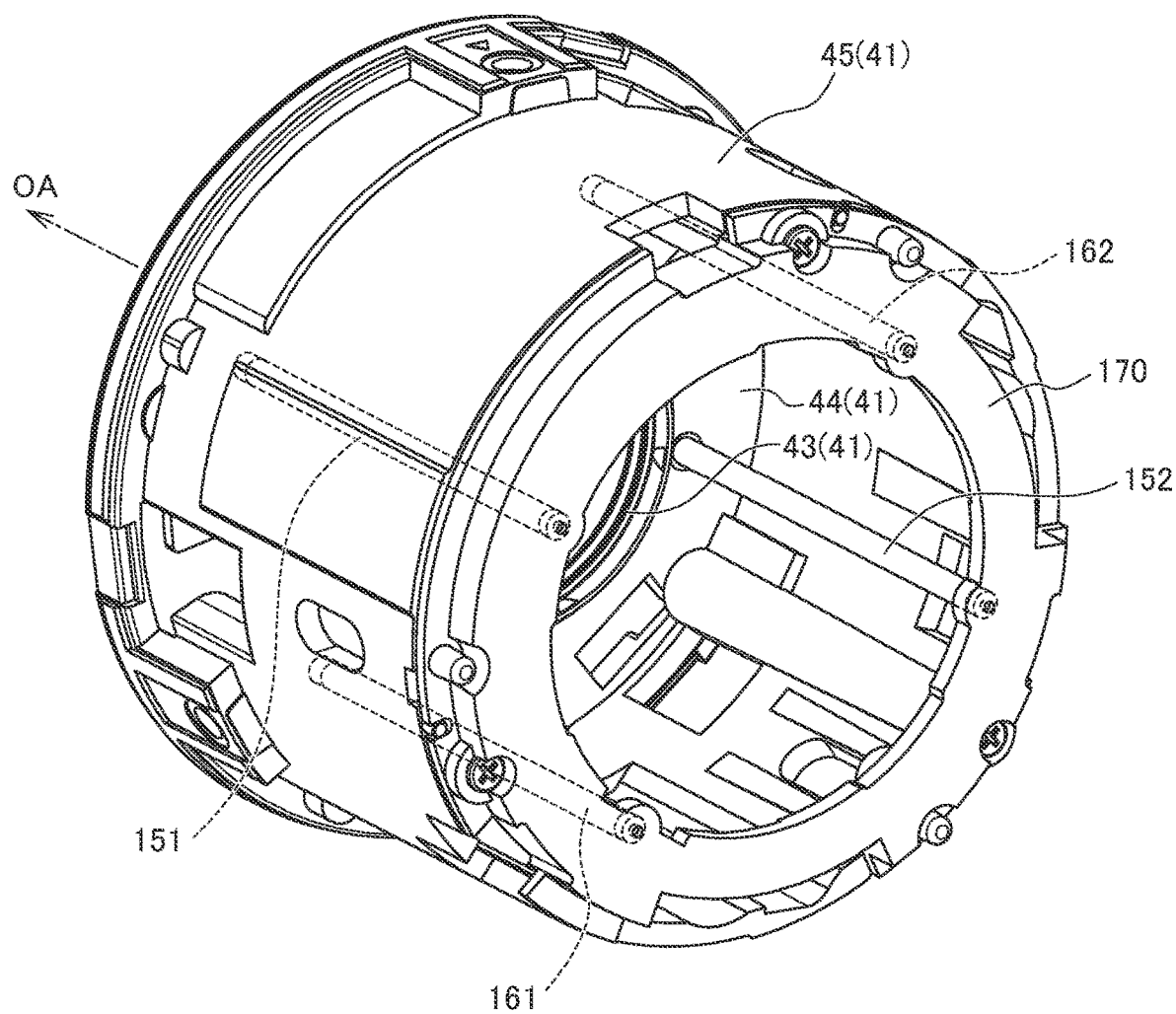
FIG. 9 is a diagram for explaining the position of a main guide bar in the optical axis OA direction.

FIG. 9 is a diagram for explaining positions of the main guide bars 151 and 161 and the sub-guide bars 152 and 162 extending in the optical axis OA. As shown, a guide bar retaining member 170 is threaded to the rear end of the fourth unit frame 41. It should be noted that the guide bar retaining member 170 may be integrally formed with the fourth unit frame 41 rather than being threaded thereto. In such a case, the guide bar retaining member 170 can also be considered as a part of the fourth unit frame 41.

The main guide bar 151 and the sub-guide bar 152 for the fifth unit and the main guide bar 161 and the sub-guide bar 162 for the sixth unit extend between the front wall portion 44 and the guide bar retaining member 170 of the fourth unit frame 41.

It should be noted that the sub-guide bar may be shared for use by the fifth unit and the sixth unit. In such a case, one guide bar can be reduced. Furthermore, the main guide bar may be shared for use by the fifth unit and the sixth unit.

(2. Lens Driving Unit Position)

With reference to FIG. 8 again, when viewed from one side of the optical axis OA (the front side in FIG. 8), the main guide bar 151 is arranged near the STM 5 (or the lead screw 502 extending from the STM 5) as compared to the sub-guide bar 152. In other words, the STM 5 (or the lead screw 502 extending from the STM 5) is positioned closer to the main guide bar 151 than the sub-guide bar 152 in the circumferential direction. The same applies to the STM 6 as well. Furthermore, as shown in FIG. 8, the main guide bar 151, the sub-guide bar 152, the main guide bar 161, and the sub-guide bar 162 are arranged concentrically as viewed from the optical axis direction.

When the STM 5 is driven and the lead screw 502 is rotated, the protrusion 510 also moves in the optical axis direction accompanying the movement of the moving rack 503 in the optical axis direction. At this time, the main guide bar engaging portion 511 is guided by the main guide bar 151 and thus moved, and positioned in the optical axis OA direction.

By positioning the main guide bar 151 and the lead screw 502 of the STM 5 to be close to each other, it is possible to suppress play (rattling) or deflection of the member between the main guide bar 151 and the lead screw 502.

It should be noted that, even for the sixth unit, when viewed in a plane at which the main guide bar 161 and the sub-guide bar 162 are perpendicular to the optical axis OA, the main guide bar 161 is arranged near the STM 6 as compared to the sub-guide bar 162.

Furthermore, reference numeral 42a shown in FIG. 8 indicates the position of an STM for aperture 42a that drives the aperture unit 42. The STM 5, the STM 6, and the aperture STM for aperture 42a are movable in the optical axis direction. As shown, when viewed from one side of the optical axis OA (the front in FIG. 8), the STM 5 for the fifth unit and the STM 6 for the sixth unit are arranged at positions that do not overlap with the STM for aperture 42a (position that does not interfere with each other). In other words, the STM 5, the STM 6, and the STM for aperture 42a are arranged to be spaced apart in this order in the circumferential direction. Thus, the STM 5, the STM 6, or the STM for aperture 42a do not collide with each other even if moved in the optical axis direction. It should be noted that the STM 5, the STM 6, and the STM 42a may be spaced apart at equal intervals. In such cases, the weight distribution can be dispersed.

(3. Shape and Arrangement of Fifth Unit Frame 50 and Sixth Unit Frame 60)

(3-1. Engagement with Guide Bar)

Figure 10:
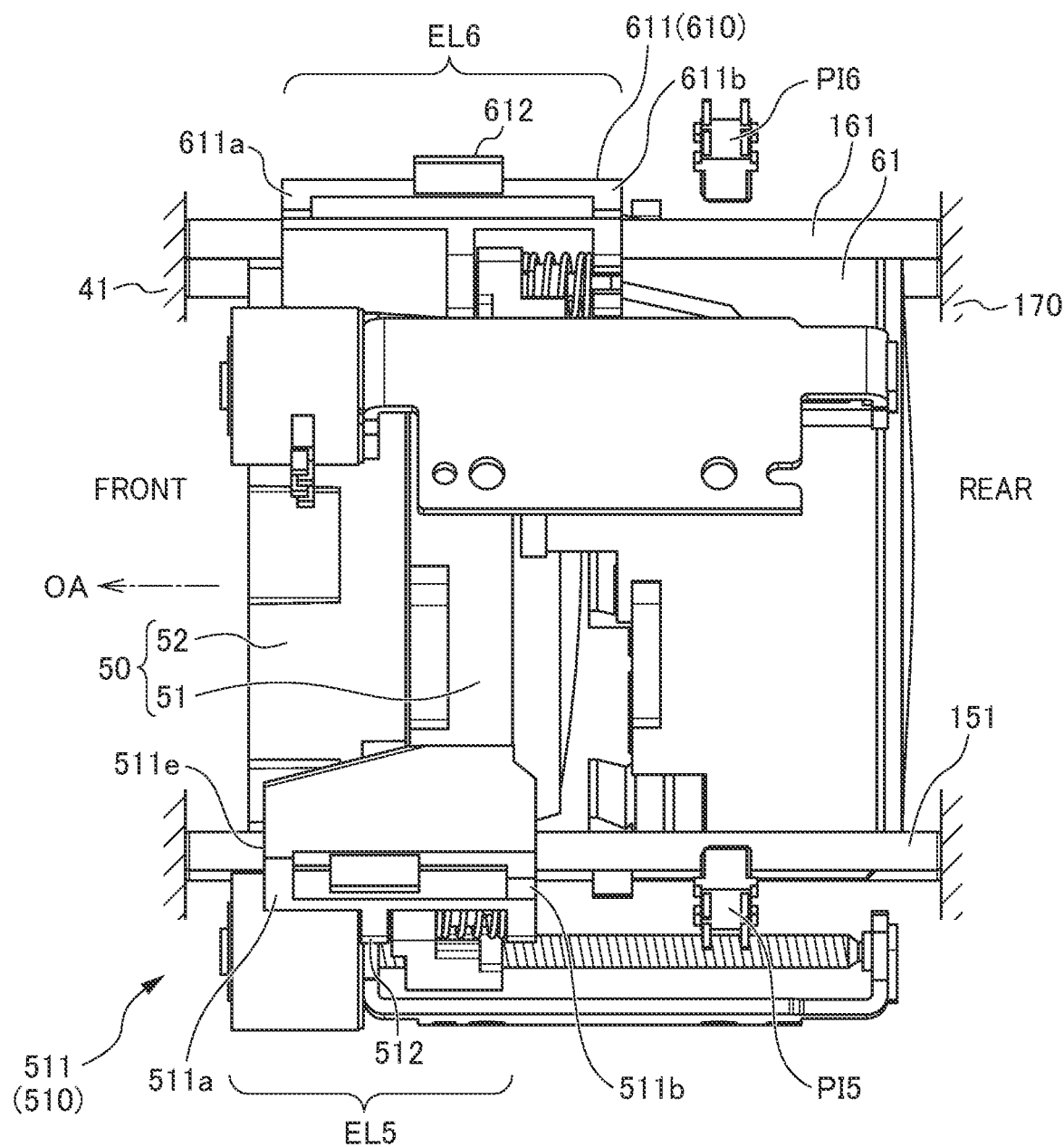
FIG. 10 is a diagram for explaining an engagement length of a main guide bar engaging portion and a main guide bar of the fifth unit tube, and an engagement length of a main guide bar engaging portion and a main guide bar of the sixth unit tube.

FIG. 10 is a diagram showing the engagement length between the main guide bar engaging portion 511 of the fifth unit holding portion 51 and the main guide bar 151, and the engagement length between the main guide bar engaging portion 622 of the sixth unit frame 60 and the main guide bar 151. As described above, the main guide bar engaging portion 511 includes the front wall 511a and the rear wall 511b which are spaced a predetermined distance apart from each other, and the main guide bar 151 is inserted into the circular guide bar insertion hole 511e provided for them. It should be noted that the front wall 511a may be connected to the rear wall 511b. That is, the main guide bar engaging portion 511 may be configured such that one guide bar insertion hole 511e is provided.

In the present disclosure, engagement length refers to the length of which the guide bar and the engaging portion engaging the guide bar are engaged. As described above, the engagement length between the main guide bar engaging portion 511 of the fifth unit holding portion 51 and the main guide bar 151 is the length from the front end of the front wall 511a to the rear end of the rear wall 511b (EL5). The engagement length between the main guide bar engaging portion 611 of the sixth unit frame 60 and the main guide bar 161 is the length from the front end of the front wall 611a to the rear end of the rear wall 611b (EL6).

It is possible to prevent the inclination of the fifth unit lens L5 by the engagement of the main guide bar engaging portion 511 with respect to the main guide bar 151. The engagement length EL5 has such a range that, when the fifth lens unit L5 is moved, the front wall 511a of the main guide bar engaging portion 511 does not hit the rear surface of the front wall portion 44 of the fourth unit frame 41, and the rear wall 511b of the main guide bar engaging portion 511 does not hit the front surface of the guide bar retaining member 170. That is, the engagement length EL5 is limited by the movement amount of the fifth lens unit L5, and the engagement length EL5 becomes short as the movement amount of the fifth lens unit L5 is large, and when the movement amount of the fifth lens unit L5 is small, it is possible to increase the engagement length EL5. The engagement length EL5 suffices so long as being a length able to prevent the inclination of the fifth lens unites L5. The same applies to the engagement length EL6 as well.

In a case in which the movement amount of the sixth lens unit L6 moved by the STM 6 is smaller than the movement amount of the fifth lens unit L5 moved by the STM 5 (in other words, in a case in which the movement amount of the fifth lens unit L5 moved by the STM 5 is larger than the movement amount of the sixth lens unit L6 moved by the STM 6), the engagement length EL6 can be longer than the engagement length EL5. In other words, the engagement length EL6 between the sixth unit frame 60 having a small movement amount in the optical axis direction and the main guide bar can be made longer than the engagement length EL5 between the fifth unit frame 50 and the main guide bar. With such a configuration, it is possible to reduce the inclination with respect to the optical axis OA of the fifth lens unit L5 and the sixth lens unit L6 which are focus lens units. It should be noted that it is not necessarily required to make the engagement length EL6 longer than the engagement length EL5. If the inclination with respect to the optical axis OA of each lens unit is sufficiently small, the engagement length may be any length.

(3-2. Cut Out Portion)

Figure 11:
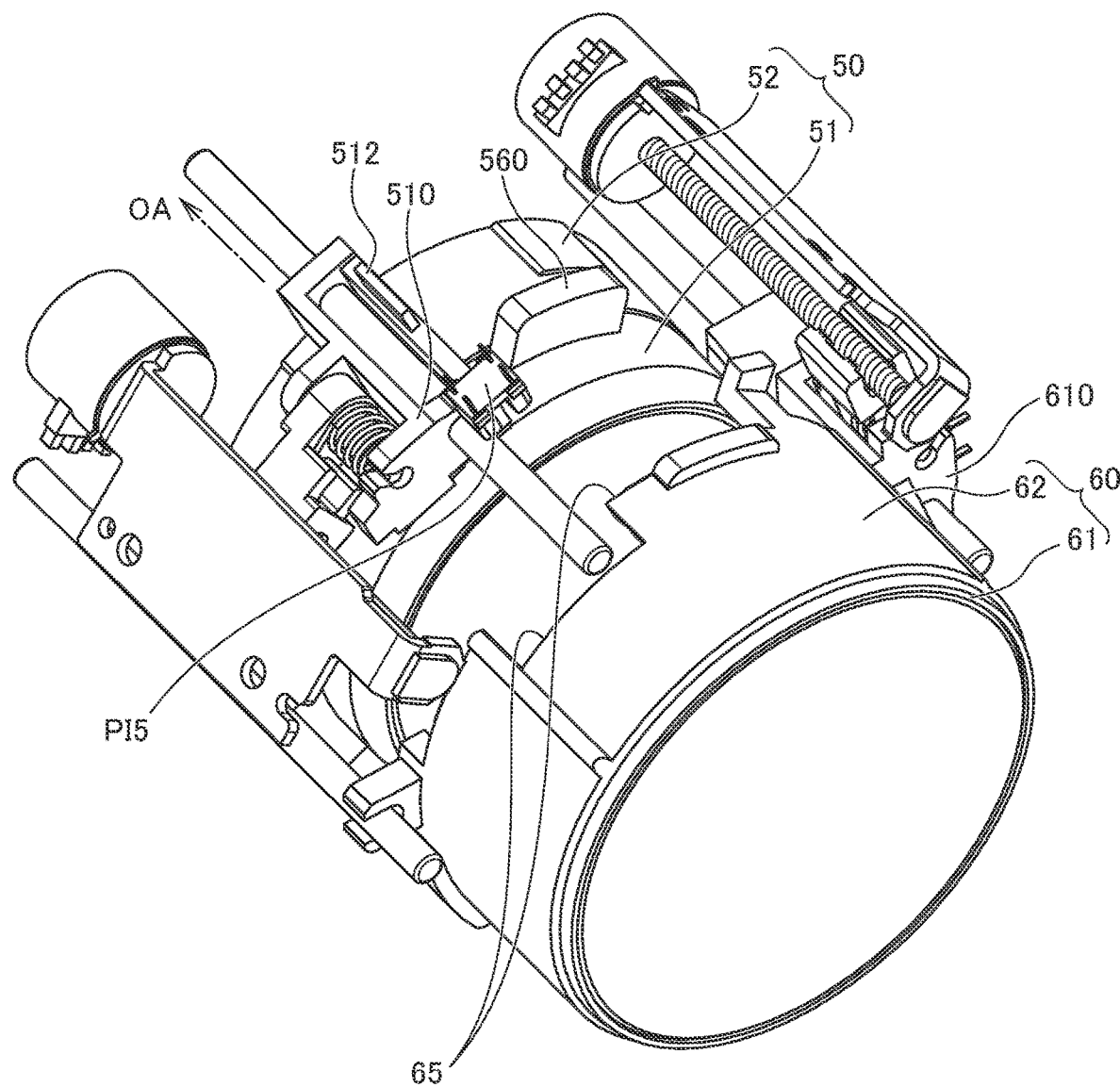
FIG. 11 is a diagram showing a positional relationship between a fifth unit frame and a sixth unit frame with the focal length on the telephoto side and with the subject distance on the infinite side.
Figure 12:
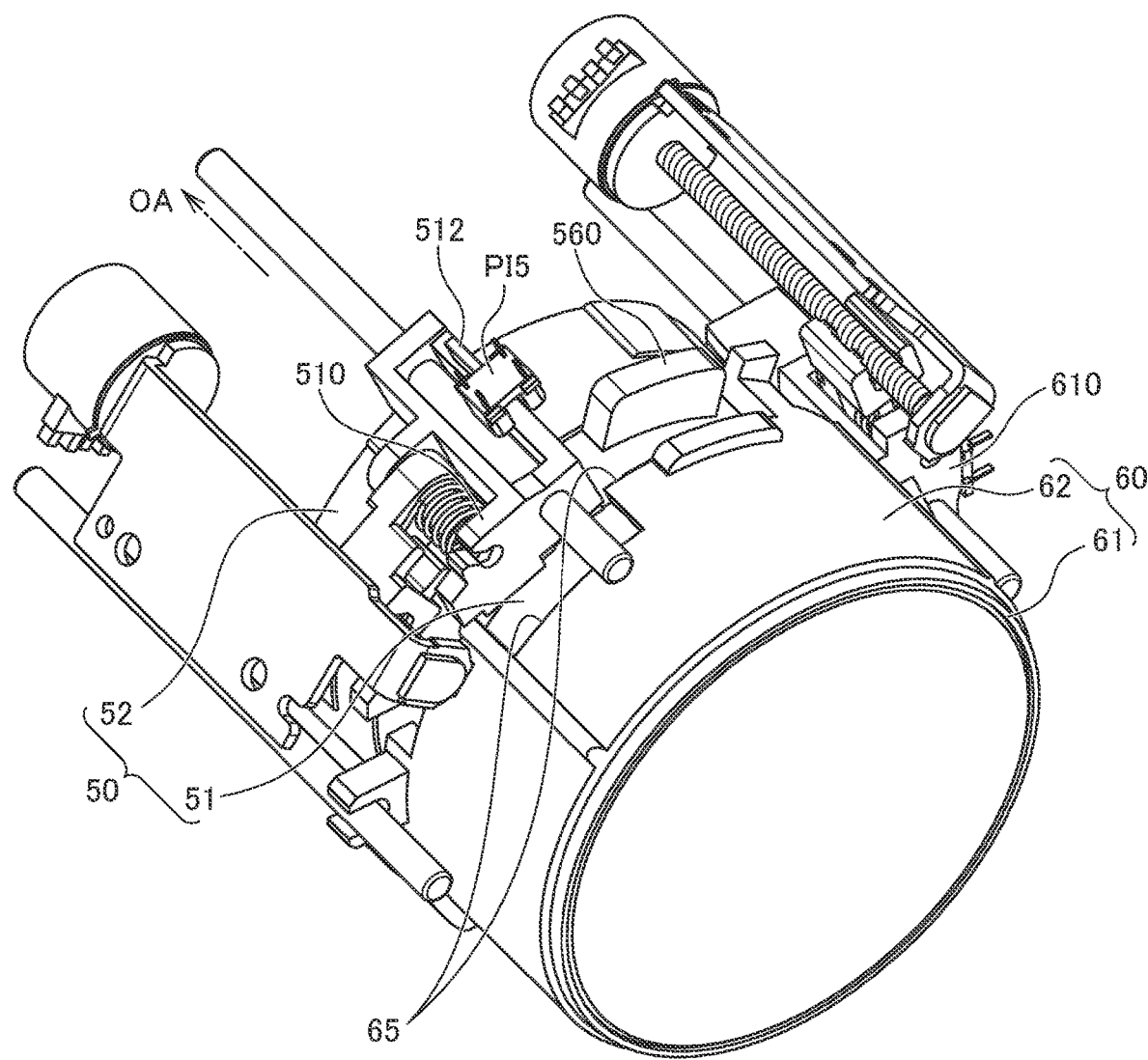
FIG. 12 is a diagram showing a positional relationship between a fifth unit frame 50 and the sixth unit frame with the focal length on the wide-angle side and with the subject distance on the close range side.
Figure 13:
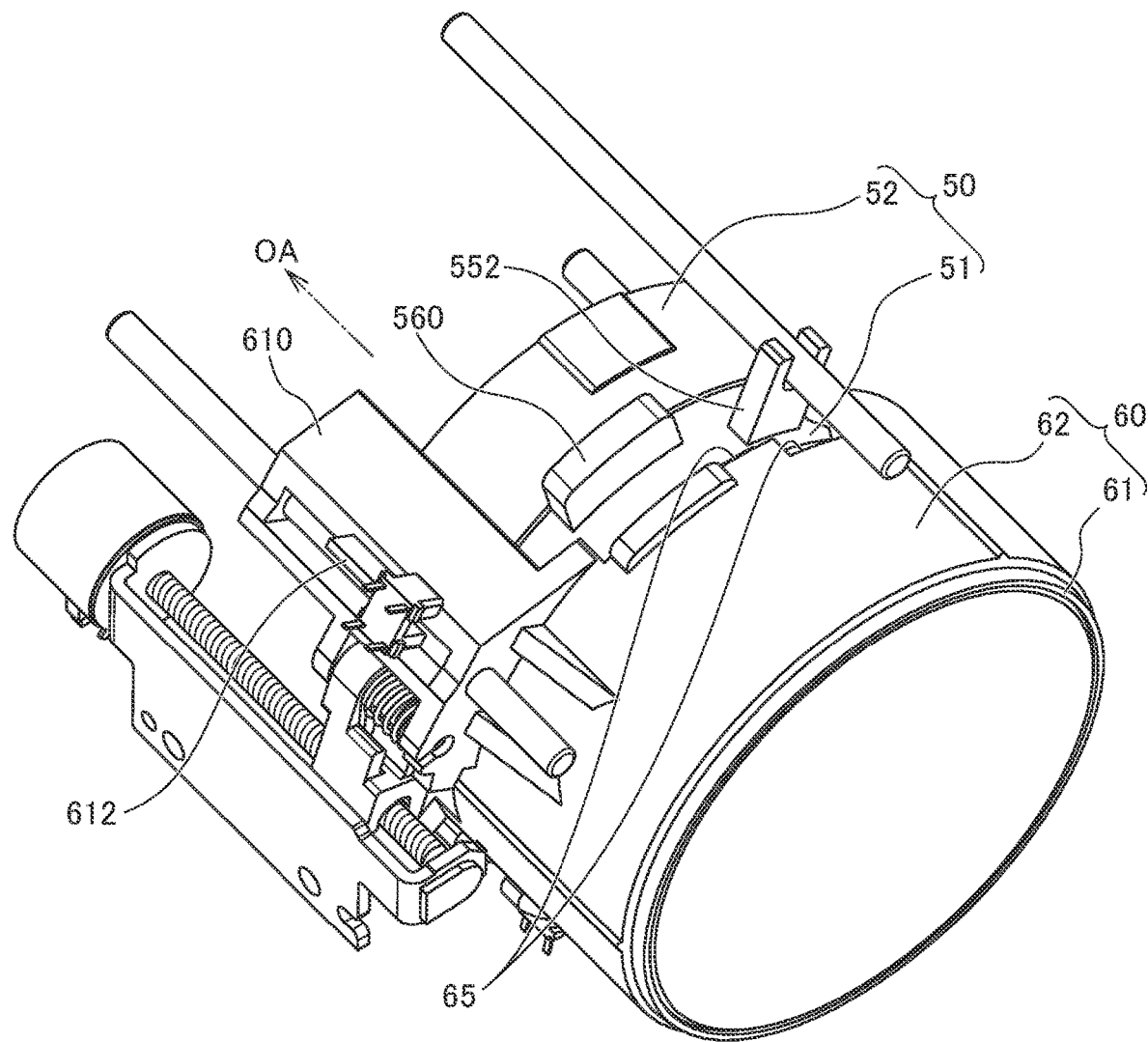
FIG. 13 is a diagram showing the positional relationship between the fifth unit frame and the sixth unit frame in the same wide-close range state as in FIG. 12 from another angle, and shows a state in which a fifth unit holding portion of the fifth unit frame and a sixth unit hood portion of the sixth unit frame approach each other.

FIG. 11 is a diagram showing the positional relationship between the fifth unit frame 50 and the sixth unit frame 60 with the focal length on the telephoto side and with the subject distance on the infinite side, and shows a state in which the fifth unit holding portion 51 of the fifth unit frame 50 and the sixth unit hood portion 62 of the sixth unit frame 60 are relatively separated from each other. FIG. 12 is a diagram showing a positional relationship between the fifth unit frame 50 and the sixth unit frame 60 with the focal length on the wide-angle side and with the subject distance on the close range side, and shows a state in which the fifth unit holding portion 51 of the fifth unit frame 50 and the sixth unit hood portion 62 of the sixth unit frame 60 are relatively close to each other. FIG. 13 is a diagram showing the positional relationship between the fifth unit frame 50 and the sixth unit frame 60 in the same state as in FIG. 12 from another angle, and showing that the fifth unit holding portion 51 of the fifth unit frame 50 and the sixth unit hood portion 62 of the sixth unit frame 60 are close to each other. As shown, the fifth unit frame 50 is arranged on the inner peripheral side of the sixth unit frame 60. In other words, in a case in which the fifth unit frame 50 or the sixth unit frame 60 is moved in the optical axis direction, there is a situation in which the fifth unit frame 50 and the sixth unit frame 60 are arranged so that at least a portion thereof overlaps with each other as viewed from the direction perpendicular to the optical axis (the radial direction). More specifically, in the state as shown in FIG. 13, the fifth unit frame 50 and the sixth unit frame 60 overlap with each other at least at a portion thereof when viewed from the direction perpendicular to the optical axis.

As shown, a plurality of projections extending on the outside diameter side such as the protrusion 510 described above (FIGS. 11 and 12), the sub-guide bar engaging portion 552 (FIG. 13), and the other projections 560 is provided at the fifth unit holding portion 51. The other projections 560 are, for example, projections necessary at the time of assembly used when attaching and crimping the fifth lens unit L5 to the fifth unit holding portion 51, and are arranged at three positions in the circumferential direction as shown in FIG. 8. In other words, the protrusions and the projections are protruding portions (projecting portions) that protrude or project in a direction (radial direction) perpendicular to the optical axis.

Here, in the embodiment, a cut out portion 65 is provided which corresponds to the projection of the fifth unit holding portion 51 (the protrusion 510, the projection 560, the sub-guide bar engaging portion 552, etc.) at the end in the optical axis OA direction of the sixth unit hood portion 62 of the sixth unit frame 60.

Therefore, as shown in FIGS. 12 and 13, even in a state in which the fifth unit frame 50 and the sixth unit frame 60 are close to each other, the projection of the fifth unit holding portion 51 (the protrusion 510, the projection 560, the sub-guide bar engaging portion 552, etc.) does not prevent the movement of the sixth unit frame 60. In other words, the fifth unit frame 50 will not collide with the sixth unit frame 60.

In other words, in a case in which the fifth unit frame 50 and the sixth unit frame 60 are close to each other, the projections of the fifth unit holding portion 51 (the protrusion 510, the projections 560, the sub-guide bar engaging portion 552, etc.) enter the cut out portion 65 of the sixth unit frame 60. In other words, in a case in which the distance between the fifth unit frame 50 and the sixth unit frame 60 is small (for example, in a case in which the fifth unit frame 50 and the sixth unit frame 60 are the closest to each other, or the distance between the fifth unit frame 50 and the sixth unit frame 60 is the smallest), the projections of the fifth unit holding portion 51 (the protrusion 510, the projections 560, the sub-guide bar engaging portion 552, etc.) overlap with the cut out portion 65 of the sixth unit frame 60 at least at a portion thereof in the circumferential direction around the optical axis. With such a configuration, it is possible to avoid collision between the fifth unit frame 50 and the sixth unit frame 60. The distance between the fifth lens unit L5 and the sixth lens unit L6 can be made closer. It is possible to make the entire lens barrel 2 more compact.

Furthermore, since the fifth unit frame 50 and the sixth unit frame 60 will not interfere with each other, it is possible to increase the relative movement amount of the optical axis OA direction between the fifth unit frame 50 and the sixth unit frame 60, thereby further improving the degree of freedom for the design of the lens units.

(3-3. Arrangement of Fifth Unit Frame 50)

Figure 14:
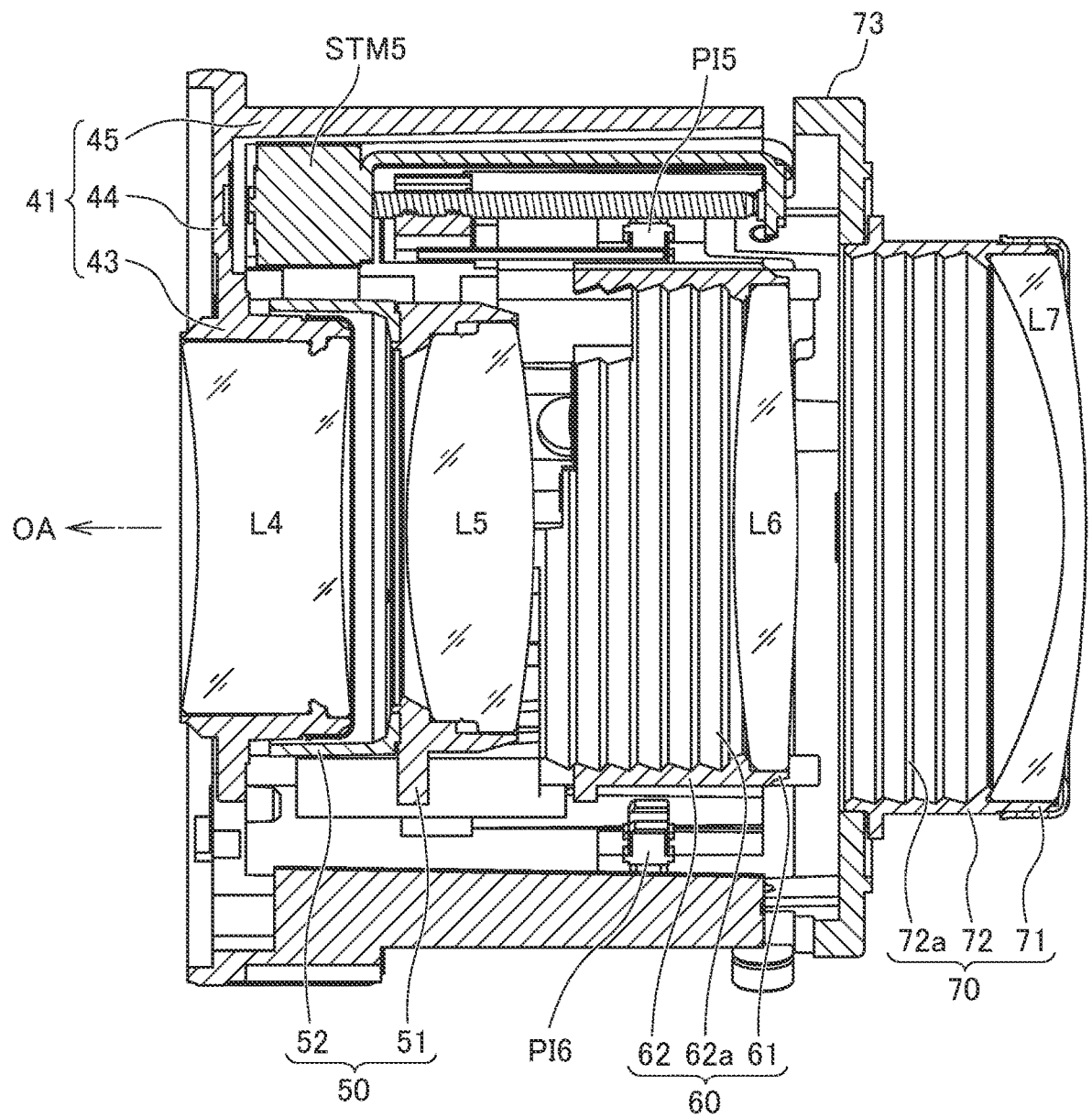
FIG. 14 is a cross-sectional view of a part of a lens barrel, and shows a state in which a fourth lens unit and a fifth lens unit approach each other.

As shown in FIG. 14, etc., the positions of the STM 5 or the STM 6 (refer to FIG. 5 for the position of the STM 6), the fifth lens unit L5, and the sixth lens unit L6 are arranged in this order from the optical axis direction. In other words, the fifth lens unit L5 is arranged between the STM 6 and the sixth lens unit L6. This makes it possible to make the lens barrel thinner in the optical axis direction than when the fifth lens unit L5, the STM 6, and the sixth lens unit L6 are arranged in this order from the optical axis direction.

(4. Hood)

Figure 15:
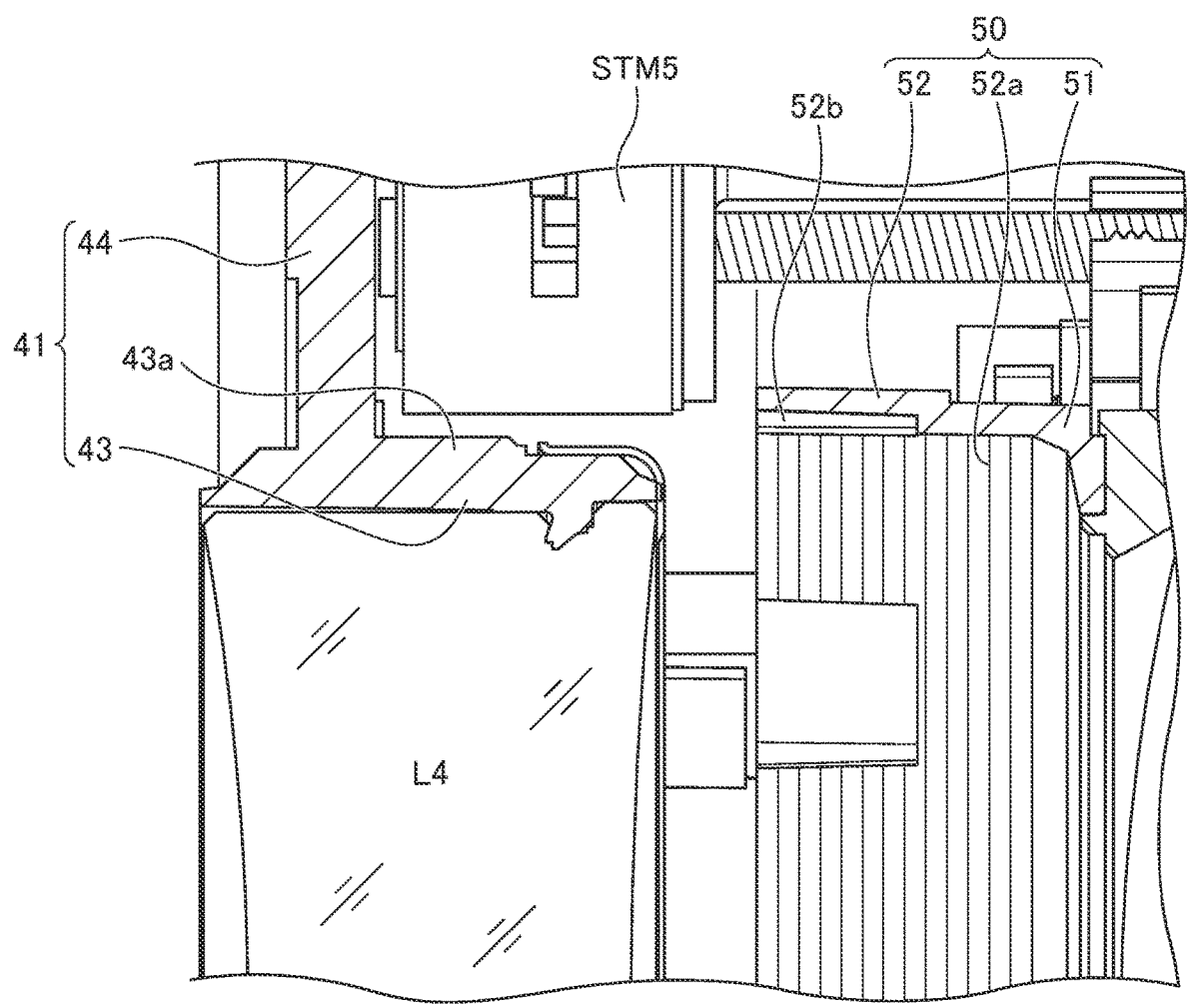
FIG. 15 is a partially enlarged view of the fourth lens unit and a fifth unit hood portion, and shows a state in which a fourth unit frame holding portion is not covered by the fifth unit hood portion.

FIG. 14 is a cross-sectional view of a part of the lens barrel 2, and shows a state in which the fourth lens unit L4 and the fifth lens unit L5 are close to each other. In a state in which the fourth lens unit L4 and the fifth lens unit L5 are close to each other, the fifth unit frame 50 (or the fifth unit hood portion 52) covers the fourth unit frame 41 (or the fourth lens unit L4 or the fourth unit holding portion 43). In other words, in a state in which the fifth lens unit L5 is the closest to the fourth lens unit L4, the fourth unit frame 41 (or the fourth lens unit L4 or the fourth unit holding portion 43) and the fifth unit frame 50 (or the fifth unit hood portion 52) overlap with each other at least partially as viewed in the radial direction about the optical axis. In other words, the fourth unit frame 41 and the fifth unit frame 50 overlap with each other at least at a portion thereof on the optical axis. The diameter of the fifth unit hood portion 52 is larger than the diameter of the fourth lens unit L4. FIG. 15 is a partially enlarged view of the fourth lens unit L4 and the fifth unit hood portion 52, and shows a state in which the fifth unit hood portion 52 does not cover the fourth unit frame 41.

In other words, FIG. 15 shows a state in which the fourth unit frame 41 and the fifth unit frame 50 do not overlap with each other in the radial direction.

Similarly, the sixth unit frame 60 and the seventh unit frame 70 also include a sixth unit hood portion 62 and a seventh unit hood portion 72.

More specifically, in a state in which the fifth lens unit L5 and the sixth lens unit L6 are close to each other, the sixth unit frame 60 (or the sixth unit hood portion 62) covers the fifth unit frame 50 (or the fifth lens unit L5 or the fifth unit holding portion 51). In other words, in a situation in which the fifth lens unit L5 and the sixth lens unit L6 are the closest to each other, the fifth unit frame 50 and the sixth unit frame 60 overlap with each other at least partially as viewed in the radial direction. In other words, the fifth unit frame 50 and the sixth unit frame 60 at least partially overlap with each other on the optical axis. The diameter of the sixth unit hood portion 62 is larger than the diameter of the fifth lens unit L5.

Furthermore, in a state in which the sixth lens unit L6 and the seventh lens unit L7 are close to each other, the seventh unit frame 70 (or the seventh unit hood portion 72) covers the sixth unit frame 60 (or the sixth lens unit L6 or the sixth unit holding portion 61). In other words, in a state in which the sixth lens unit L6 and the seventh lens unit L7 are the closest to each other, the sixth unit frame 60 and the seventh unit frame 70 overlap with each other at least partially as viewed in the radial direction. In other words, the sixth unit frame 60 and the seventh unit frame 70 overlap with each other at least partially on the optical axis. The diameter of the seventh unit hood portion 72 is larger than the diameter of the sixth lens unit L6.

As shown in the drawings, the fifth unit hood portions 52, the sixth unit hood portions 62, and the seventh unit hood portions 72 extend forward from the fifth lens unit L5, the sixth lens unit L6, and the seventh lens unit L7, respectively, thereby preventing ghosting due to stray light or the like. It should be noted that each hood portion may extend toward the rear side.

As shown in FIG. 5, the motor sliding tube 100 covers the outer peripheries of the fifth lens unit L5 and the sixth lens unit L6. However, a plurality of holes and the like for the photo interrupter, the STM 5, the STM 6 or the like to be attached is provided for the motor sliding tube 100. Furthermore, a plurality of holes and the like for screw fixing for attaching them are also provided.

Thus, since the motor sliding tube 100 is provided with a plurality of the holes, the subject light leaks and is advanced to the outside of the motor sliding tube 100, or light enters from a hole and is mixed with the subject light to become stray light, which may deteriorate the photographed image.

For example, the number of holes for attaching the STMs increases more in the case of two STMs than in the case of one STM fixed to the motor sliding tube 100, and the possibility of deterioration of a photographed image such as ghosting increases.

However, it is possible to prevent the photographed image from being deteriorated due to stray light by providing the fifth unit hood portion 52, the sixth unit hood portion 62, and the seventh unit hood portion 72. It should be noted that, in the embodiment, the fifth unit hood portion 52 is separated from the fifth unit holding portion 51, the sixth unit hood portion 62 is integrated with the sixth unit holding portion 61, and the seventh unit hood portion 72 is integrated with the seventh unit holding portion 71 in the drawings. However, the present invention is not limited thereto, and the hood and the lens frame may be integrated with each other or may be separated from each other.

The fifth unit hood portion 52, the sixth unit hood portion 62, and the seventh unit hood portion 72 surround the lens units on the front side in the optical axis OA direction by the hoods of the lens units on the rear side when the lens units move in the optical axis OA direction.

As shown in FIG. 14, the diameters are larger in the order of the fifth unit hood portion 52, the sixth unit hood portion 62, and the seventh unit hood portion 72.

Furthermore, in a case in which there is a protruding portion protruding on the outside diameter side of the hood portion located on the inside diameter side, a recess (relief portion) is provided that allows the protruding portion to escape in the hood portion of the outside diameter side. For example, a protruding portion 43a is provided at the outer circumference of the fourth unit holding portion 43 as shown in FIG. 15, and a recess (groove) 52b corresponding to the protruding portion 53a is provided at the fifth unit hood portion 52 of the outside diameter side. Since it is possible to allow the protruding portion 53a to escape by the recess 52b, it is possible to prevent collision between the fourth unit holding portion 43 and the fifth unit hood portion 52. Furthermore, it is possible to cover the fourth unit holding portion 43 by the fifth unit hood portion 52, and thus, it is possible to prevent the leakage of subject light and the deterioration of a photographed image due to the influence of stray light or the like. Similarly, in a case in which there is a protruding portion on the outside diameter side of the fifth unit holding frame 50, a recess may be provided at the sixth unit hood portion 62. In a case in which there is a protruding portion on the outside diameter side of the sixth unit frame 60, a recess may be provided at the seventh unit hood portion 72. It should be noted that it is not limited to the recess (groove), and may be, for example, a cut out portion. Furthermore, it is not necessary for all of the hood portions to include a recess (groove).

Furthermore, the recess (groove, relief portion) 52b may be located on the entire circumference in the circumferential direction, or may be located partially on the circumference.

Furthermore, the light shielding line extending in the circumferential direction (light shielding lines 52a, 62a, 72a) is provided on the inner surface of the fifth unit hood portion 52, the sixth unit hood portion 62, and the seventh unit hood portion 72. The light shielding line may be a groove or a step.

It should be noted that the fifth unit hood portion 52, the sixth unit hood portion 62, and the seventh unit hood portion 72 may each be provided with a light shielding line, or there may be a hood that does not have a light shielding line.

Furthermore, as can be seen from FIG. 14, etc., the STM 5 or the STM 6 (refer to FIG. 5 for the position of the STM 6), the fifth lens unit L5, and the sixth lens unit L6 are arranged in this order from the subject side in the optical axis direction. As shown in the drawings, the fifth lens unit L5 has a smaller diameter than that of the sixth lens unit L6. In other words, in the embodiment, the STM, the small diameter lens (the fifth lens unit L5), and the large diameter lens (the sixth lens unit L6) are arranged in this order from the subject side in the optical axis direction. Therefore, the diameter of the sixth unit hood portion 62 is larger than the diameter of the fifth lens unit L5.

As described above, the fifth unit hood portion 52 extends toward the front side from the fifth lens unit L5, and the sixth unit hood portion 62 extends toward the front side from the sixth lens unit L6. When the fifth lens unit L5 and the sixth lens unit L6 are moved in the optical axis OA direction, the fifth unit hood portion 52 and the sixth unit hood portion 62 are also moved.

As shown in FIG. 14, when the fifth lens unit L5 is close to the STM 5 (or the STM 6), there is a case in which the fifth unit hood portion 52 is arranged on the inside diameter side of the STM 5 (or the STM 6).

At this time, since the diameter of the fifth lens unit L5 is small, even considering a situation where the fifth unit hood portion 52 is arranged on the inside diameter side of the STM 5 (or the STM 6), the outside diameter of the entire lens barrel 2 need not be increased.

Furthermore, the STM 5 (or the STM 6) is arranged on the outer circumference of the fourth lens unit L4 arranged further forward than the fifth lens unit L5. The fourth lens unit L4 has a smaller diameter than that of the fifth lens unit L5, and the outside diameter of the fourth unit holding portion 43 is smaller than that of the fifth unit hood portion 52. In other words, the diameter of the fifth unit hood portion 52 is larger than the diameter of the fourth lens unit L4.

In other words, a plurality of lens units of which diameters increase in order are arranged in the optical axis OA direction, and the STM 5 (or the STM 6) is arranged on the outer circumference of the fourth lens unit L4 which is the smallest lens unit therein.

According to this, the STM 5 (or the STM 6) is arranged on the outside diameter side of the fourth lens unit L4 which is the smallest lens unit, and it is possible to place the fifth unit hood portion 52 having a larger diameter than the fourth lens unit L4 in the gap between the fourth lens unit L4 and STM 5. Therefore, it is possible to make the distance between the fourth lens unit L4 and the fifth lens unit L5 close, and thus, it is possible to make compact in the optical axis OA direction or the radial direction.

Furthermore, the fourth lens unit L4 is arranged behind the aperture unit 42. The lens unit behind the aperture unit 42 is often smaller than the other lens units. Therefore, by arranging the aperture unit 42, the minimum diameter lens (the fourth lens unit L4), the small diameter lens (the fifth lens unit L5), and the large diameter lens (the sixth lens unit L6) in this order from the subject side in the optical axis direction, and arranging the STM 5 (or the STM 6) on the outside diameter side of the minimum diameter lens (the fourth lens unit L4), the lens barrel 2 can be made compact.

It should be noted that all of the fifth unit frame 50, the sixth unit frame 60, and the seventh unit frame 70 may not necessarily be provided with a hood portion. It suffices if one or two among the fifth unit frame 50, the sixth unit frame 6, and the seventh unit frame 70 is provided with a hood portion.

It should be noted that the hood of the rear lens unit overlaps the front lens unit in a situation where the front and rear lens units are the closest to each other; however, the present invention is not limited thereto. It suffices if the length is enough to prevent the deterioration of the photographed image, and thus such overlapping is not necessarily needed.

(5. Photo Interrupter)

As shown in FIG. 5, a fifth unit photo interrupter PI5 and a sixth unit photo interrupter PI6 are mounted on the motor sliding tube 100 (only the fifth unit photo interrupter is shown in FIG. 5). Hereinafter, a description will be given of the fifth unit photo interrupter PI5. The description of the sixth unit photo interrupter PI6 is similar to that of the fifth unit photo interrupter PI5, and thus, the description thereof will be omitted.

As shown in FIG. 6, etc., when the fifth lens unit L5 is driven by the fifth lens unit driving unit 500, the fifth unit photo interrupter PI5 is arranged at a position where the light shielding portion 512 can pass between the light emitting portion and the light receiving portion of the fifth unit photo interrupter PI5.

The light shielding portion 512 is arranged on the outside diameter side of the fifth lens unit L5 on the optical axis OA in order to perform the position detection.

Incidentally, the position of the lens unit when the power of the camera body 3 is turned ON is not fixed since it depends on the state when the power is turned OFF. Therefore, the position of each lens unit when the power of the camera body 3 is turned ON is not fixed, and thus, it is not known where it is located.

Therefore, referring to the fifth lens unit L5 as an example, at first, the STM 5 is driven by a drive instruction from the control unit 90 of the main board 88 to move the fifth unit frame 50. Then, the light shielding portion 512 provided in the fifth unit holding portion 51 passes between the light emitting unit and the light receiving unit of the fifth unit photo interrupter PI5, thereby detecting the fifth lens unit L5. The fifth lens unit L5 is moved with the position of the fifth lens unit L5 when the light shielding portion 512 passes through (shields) PI5 as a reference position. In other words, the fifth unit photo interrupter PI5 is arranged at the reference position of the fifth lens unit L5. Hereinafter, the reference position of the fifth lens unit L5 is referred to as a fifth unit origin position. The same also applies to the sixth unit as well.

The fifth lens unit L5 moves to an initial position after moving to the reference position (the origin position). The initial position is a position of the infinite side of a focal length that is set (e.g., infinite end). In a case in which the initial position is set to the infinite side, a through image with less blurring can be displayed. In addition, imaging with the focus position (imaging distance) set to the infinite side eliminates the need for the user to change the imaging distance after the initial operation.

Figure 16:
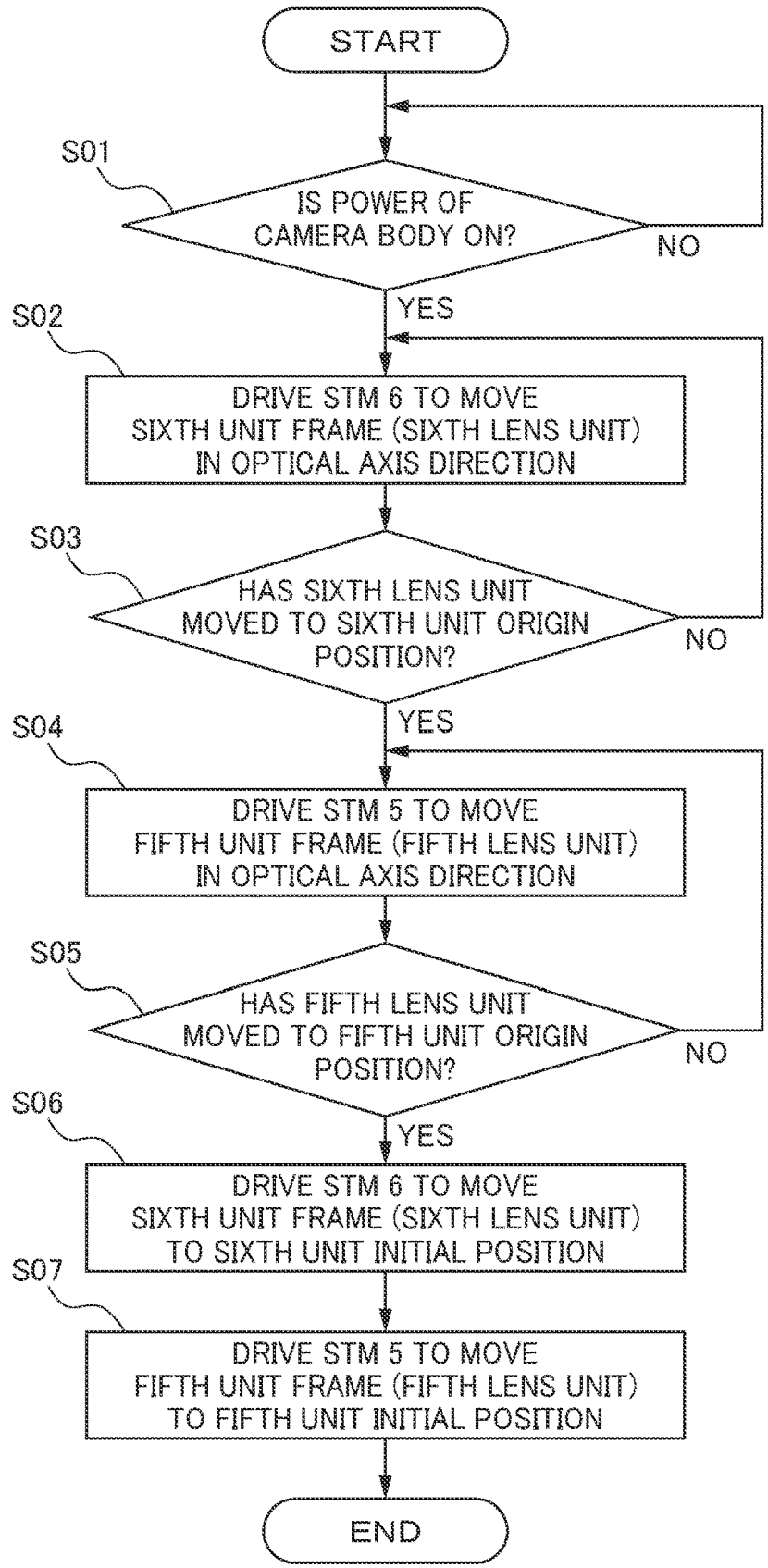
FIG. 16 is a flowchart for explaining an initial operation of a control unit of a lens barrel.

FIG. 16 is a flowchart for explaining an initial operation of the control unit 90 of the lens barrel 2. This flowchart is started when the user turns on the power of the camera body 3.

In S01, the control unit 90 detects that the power of the camera body 3 is turned ON, and the processing advances to S02.

In S02, the control unit 90 drives the STM 6 and moves the sixth unit frame 60 (the sixth lens unit L6) in the optical direction, and the processing advances to S03.

In S03, the control unit 90 determines whether or not the sixth lens unit L6 has moved to the sixth unit origin position. As described above, the control unit 90 can perform the determination by detecting whether the PI6 is shielded by the light shielding portion 612. In a case in which the control unit 90 determines that the sixth lens unit L6 has moved to the sixth unit origin position, the processing advances to S04. Otherwise, the processing returns to S02, and repeats S02 and S03 until the control unit 90 determines that the sixth lens unit L6 has moved to the sixth unit origin position.

In S04, the control unit 90 drives the STM 5 and moves the fifth unit frame 50 (the fifth lens unit L5) in the optical axis direction. The processing advances to S05.

In S05, the control unit 90 determines whether the fifth lens unit L5 has moved to the fifth unit origin position. As described above, the control unit 90 can perform the determination by detecting whether PI5 is shielded by the light shielding portion 512. In a case in which the control unit 90 determines that the fifth lens unit L5 has moved to the fifth unit origin position, the processing advances to S06. Otherwise, the processing returns to S04, and repeats S04 and S05 until the control unit 90 determines that the fifth lens unit L5 has moved to the fifth unit origin position.

In S06, the control unit 90 drives the STM 6, and moves the sixth unit frame 60 (the sixth lens unit L6) to the sixth unit initial position. As described above, the sixth unit initial position is a position of the infinite end in the focal length that is set. For example, in a case in which the positions of L1 to L4, the motor sliding tube 100, and the L7 are in the state of the wide-angle end by the zoom ring 81, the control unit 90 drives the STM 6 so that the sixth lens unit L6 moves up to the infinite end position of the wide-angle end (W∞). The processing advances to S07.

In S07 the control unit 90 drives the STM 5 to move the fifth unit frame 50 (the fifth lens unit L5) to the fifth unit initial position. The fifth unit initial position is also an infinite position in the focal length that is set. In a case in which S07 is executed, the control unit 90 ends the initial operation. It should be noted that the initial position is the position of the infinite end in the focal length that is set; however, the present invention is not necessarily limited thereto. For example, it may be a position on the close range side (for example, the close range end) in the focal length that is set, or may be a position between the infinite end and the close range end.

Here, by changing the position of the PI (the origin position), it is possible to shorten or average the time taken for the initial operation shown in FIG. 16.

Figure 17:
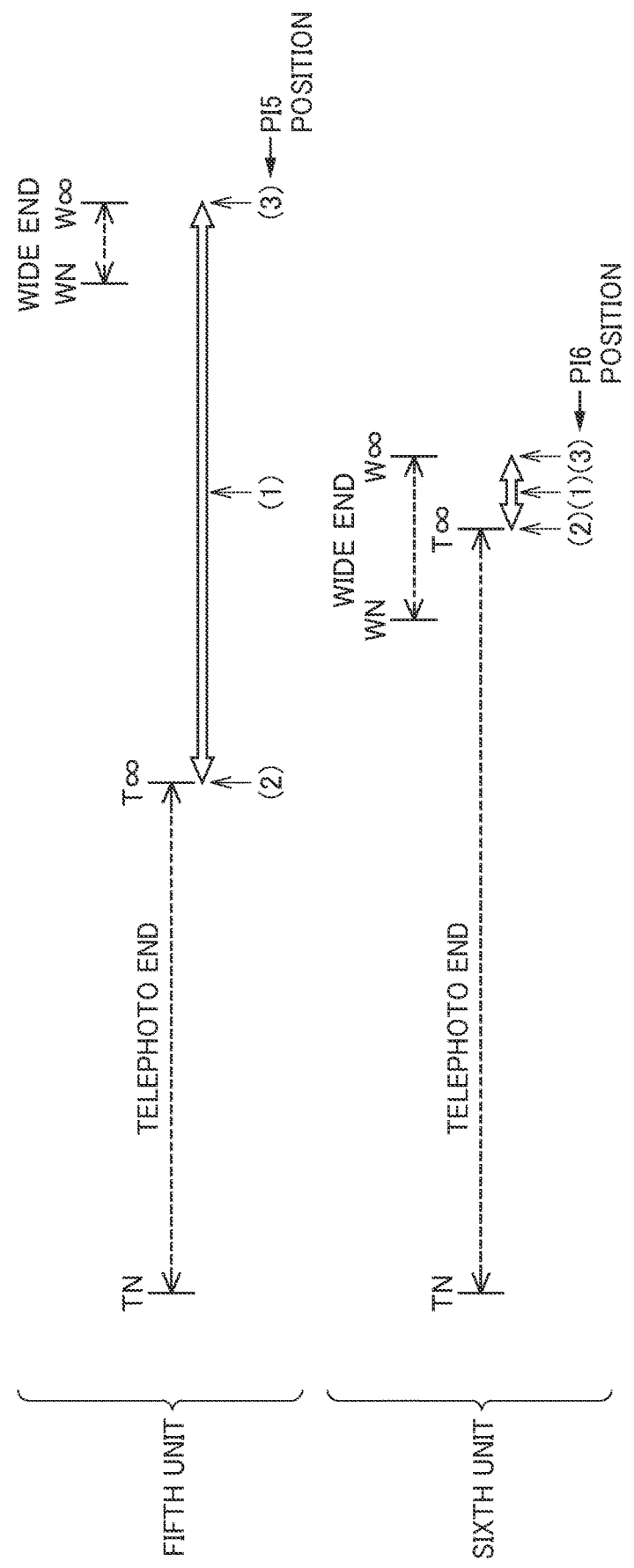
FIG. 17 is a diagram showing a position on an optical axis of a fifth unit photo interrupter and a position of a sixth unit photo interrupter.

A detailed description will be provided below. FIG. 17 is a diagram showing a position on the optical axis OA of the fifth unit photo interrupter PI5 and a position of the sixth unit photo interrupter PI6. Hereinafter, the fifth unit and the sixth unit will be described collectively. In FIG. 17 the close range end (TN) position of the telephoto end of the fifth lens unit L5 and the close range end (TN) position of the telephoto end of the sixth lens unit L6 are shown at the same position in the optical axis direction; however, these are actually located at different positions. The TN position of the fifth lens unit L5 is located closer to the front side (the subject side, the object side) in the optical axis direction than the TN position of the sixth lens unit L6.

In a case in which the imaging distance is changed in a state of the focal length being at the telephoto end, L5 and L6 move between the close range end (TN) position of the telephoto end and the infinite end (T∞) position of the telephoto end. In a case in which the imaging distance is changed in the state of the focal length being at the wide-angle end, L5 and L6 move between the close range end (WN) position of the wide-angle end and the infinite end (W∞) position of the wide-angle end.

Therefore, when the power is turned ON in S1 of FIGS. 16, L5 and L6 are arranged at any position between TN and W∞.

Therefore, in a case in which the photo interrupter PI5 (or PI6) is arranged at any position within the range from TN to W∞ in which the fifth unit frame 50 (or the sixth unit frame 60) moves, it is possible to shorten or average the time taken for the initial operation. Although FIG. 17 shows an example in which the close range end is present closer to the subject side than the infinite end, the infinite end may be present closer to the subject side than the close range end. In this case, it suffices if the photo interrupter PI5 (or PI6) is arranged at any position within the range from T∞ to WN in which the fifth unit frame 50 (or the sixth unit frame 60) moves.

Hereinafter, three different configurations of the positions of the photo interrupter PI5 or PI6 will be described.

(1) Place the Photo Interrupter at the Position Shown by (1) in FIG. 17.

That is, the photo interrupter PI5 or PI6 is arranged between the infinite end (T∞) position of the telephoto end and the infinite end (W∞) position of the wide-angle end. In other words, the PI5 (or PI6) is arranged at any position within the range in which the fifth lens unit L5 (or the sixth lens unit L6) moves when the focal length is changed in a state of the imaging distance being infinite, and the fifth unit frame 50 (or the sixth unit frame 60) is detected. Thus, it is possible to shorten the time required to move from the origin position to the initial position. Furthermore, the photo interrupter PI5 or PI6 may be arranged at the center portion between the T∞ and W∞. In other words, the PI5 (or PI6) is arranged at the center portion in a range in which the fifth lens L5 (or the sixth lens unit L6) can move when the focal length is changed in a state of the imaging distance being indefinite, and the fifth unit frame 50 is detected. The center portion may not be strictly central, and it may be shifted back and forth to some extent. For example, it suffices if the center portion may be arranged at the middle point within the range when W∞ is divided into three equal parts from T∞. Alternatively, the center portion may be arranged within the range having a predetermined length to the front and rear from the center portion (for example, 3 mm in the front and 3 mm in the rear).

In this case, irrespective of the focal length that is set, it is possible to average the time to move the L5 or L6 from the origin position to the initial position.

Although FIG. 17 shows an example in which the close range end is present closer to the subject side than the infinite end, the infinite end may be present closer to the subject side than the infinite end.

(2) Place the Photo Interrupter at the Position Shown by (2) in FIG. 17.

That is, the photo interrupter PI5 or PI6 is arranged in the proximity of (near) the infinite end (T∞) position of the telephoto end. In other words, the PI5 (or PI6) is arranged near the position at which the fifth unit frame 50 (or the sixth unit frame 60) in a state with the imaging distance at the infinite end and the focal length at the telephoto end is arranged. The T∞ vicinity may not be exactly the T∞ position and may be shifted back and forth to some extent. For example, the photo interrupter PI5 or PI6 may be arranged within the range having a predetermined length to the front and rear from the T∞ position (for example, 3 mm in the front and 3 mm in the rear).

For example, if the lens barrel has the shortest length when the focal length is at the telephoto end, it is probable that in many cases the photographer will set the lens barrel 2 in the state of being at the telephoto end to shorten the lens barrel 2 when the photographer is not imaging (for example, when the power is OFF). In this case, the initial position is likely to be T∞ because the power is supposed to be turned ON in the state of the telephoto end. Therefore, by placing the PI5 or PI6 in the position (T∞) shown by (2), since the origin position and the initial position are located at the same position, it is possible to shorten the time to move the L5 or L6 from the origin position to the initial position. Furthermore, if the state of the lens barrel 2 at the time the power is turned ON is the telephoto side even if not the telephoto end, since the origin position and the initial position are close to each other, it is possible to shorten the time for moving the L5 or L6 from the origin position to the initial position. As a result, it is possible to shorten the time of the initial operation of the camera 1 as a whole.

Furthermore, the position of L5 or L6 when the power of the camera body 3 is turned ON (the position of L5 or L6 in S01 of FIG. 16) is any position in a range in which the L5 or L6 can move (between W∞ and TN, as an example in FIG. 17). That is, when the power is turned ON, it is required for the control unit 90 to move the L5 or L6 from any position within the range in which the L5 or L6 can move to the position of the photo interrupter PI5 or PI6 (the origin position). Therefore, by arranging the PI5 or PI6 in the position shown by (2), it is possible to average or shorten the time taken from power-ON to the origin position detecting. It should be noted that, in the case of a lens having a movable range in which, for example, L6 moves, a photo interrupter may be arranged at the center portion of the movable range, rather than near T∞. In the same manner as described above, the center portion may not be strictly a center portion.

Although FIG. 17 shows an example in which the close range end is present closer to the subject side than the infinite end, the infinite end may be present closer to the subject side than the close range end. In this case, the photo interrupter PI5 or PI6 may be arranged at the close range end (TN) position of the telephoto end.

(3) Place the Photo Interrupter at the Position Shown by (3) in FIG. 17.

That is, the photo interrupter PI5 or PI6 is arranged near the infinite end (W∞) position of the wide-angle end. In other words, the PI5 (or PI6) is arranged at a position where the fifth unit frame 50 (or the sixth unit frame 60) is arranged in a state in which the imaging distance is at the infinite end and the focal length is at the wide-angle end. The W∞ vicinity may not be exactly the W∞ position and may be shifted back and forth to some extent. For example, the photo interrupter PI5 or PI6 may be arranged within the range having a predetermined length to the front and rear from the W∞ position (for example, 3 mm in the front and 3 mm in the rear).

For example, if the lens barrel has the shortest length when the focal length is at the wide-angle end, it is probable that in many cases the photographer will set the lens barrel 2 in the state of being at the wide-angle end to shorten the lens barrel 2 when the photographer is not imaging (for example, when the power is off). In this case, the initial position is likely to be W∞ because the power is supposed to be turned ON in the state of the wide-angle end. Therefore, by placing the PI5 or PI6 in the position (W∞) shown by (3), since the origin position and the initial position are located at the same position, it is possible to shorten the time to move the L5 or L6 from the origin position to the initial position. Furthermore, if the state of the lens barrel 2 at the time the power is turned ON is the wide-angle side even if not the wide-angle end, since the origin position and the initial position are close to each other, it is possible to shorten the time for moving the L5 or L6 from the origin position to the initial position. As a result, it is possible to shorten the time of the initial operation of the camera 1 as a whole.

In addition, both the PI5 and the PI6 may be arranged in the positions of (1) to (3) described above, or either one of them may be arranged in the positions of (1) to (3) described above.

Furthermore, in the description above, it has been described with an example in which the position of the infinite end in the focal length being set is set as an initial position. However, the present invention is not limited thereto. For example, the position of the close range end may be the initial position. In such a case, the following cases are considered. (1A) Place the PI between TN and WN. More specifically, place the PI in the central range between TN and WN. (2A) Place the PI in the vicinity of TN. (3A) Place the PI in the vicinity of WN.

Furthermore, as described in (2) above, the PI may be arranged at a position where it is possible to detect any position within the range in which the lens can move. In other words, the PI5 (or PI6) detects that the fifth lens unit L5 (or the sixth lens unit L6) is arranged at any position (the origin position) in a range in which the fifth lens L5 (or the sixth lens unit L6) can move. For example, it is considered that the any position may be a center portion in a range in which the fifth lens unit L5 (or the sixth lens unit L6) can move. In the same manner as described above, it may not be exactly located at the center.

Although FIG. 17 shows an example in which the close range end is present closer to the subject side than the infinite end, the infinite end may be present closer to the subject side than the close range end. In this case, the range in which the fifth lens unit L5 or the sixth lens unit L6 can move is from the close range at the wide-angle end to the infinite at the telephoto end.

(6. Rattle Prevention)

With reference to FIG. 2 again, a description will be given of rattle prevention of the motor sliding tube 100. As shown, a coil spring 171 as an elastic member is arranged between the rear end surface of the motor sliding tube 100 in the optical axis OA direction and the front end surface of a guide bar retaining member 170. The front end surface of the guide bar retaining member 170 may be planar. A tension spring or another pressing member may be used in place of the coil spring 171. Furthermore, in FIG. 2, the rear end of the motor sliding tube 100 is energized by a spring. However, the present invention is not limited thereto. A spring or a pressing member may be arranged between the front end (the front surface) of the motor sliding tube 100 and the fourth unit frame.

By energizing the motor sliding tube 100 in the optical axis direction by the coil spring 171, it is possible to reduce the influence of rattling. Since the cam pin 101 is pressed against the side surface of the circumferential groove 83a of the inner cam tube 83 for rattle prevention, it is possible to perform the positioning of the motor sliding tube 100 in the optical axis OA direction with high accuracy. In other words, it is possible to prevent rattling since the cam pin 101 is pressed against one surface of the circumferential groove 83a (the cam groove) of the inner cam tube 83 by the coil spring 171.

Furthermore, as shown in FIG. 2, the cam pin 101 and the coil spring 171 are arranged along the optical axis direction on a plane parallel to the optical axis. With such a configuration, since the positions in the circumferential direction of the cam pin 101 and the coil spring 171 coincide, it is possible to perform the energizing efficiently. In addition, a plurality of cam pins 101 and a plurality of coil springs 171 may be provided. For example, three pairs of them may be arranged along the circumferential direction.

Although the fifth lens unit L5 and the sixth lens unit L6 are moved in the optical axis direction by the STM in the description above, the present invention is not limited thereto. For example, other units of lenses may be moved in the optical axis direction by the STM.

It has been described that the motor sliding tube 100 moves in the optical axis direction in mechanical conjunction with the zoom ring 81. However, the present invention is not limited thereto. For example, it may be a configuration such that a motor is provided which causes the outer cam tube 82 or the inner cam tube 83 to rotate, and the motor sliding tube 100 moves in the optical axis direction by the motor causing the outer cam tube 82 or the inner cam tube 83 to rotate during zoom or focus.

The STM 5, the STM 6, the PI5, and the PI6 are fixed to the motor sliding tube 100. By fixing the component for driving the fifth lens unit L5 and the sixth lens unit L6 which are the focus lenses to one tube in this manner, errors due to rattling are less likely to occur in the fifth lens unit L5 and the sixth lens unit L6. Therefore, it is possible to perform higher performance focus control.

Furthermore, since the motor sliding tube 100 can move in the optical axis direction, the fifth lens unit L5 and the sixth lens unit L6 can be moved greatly in the optical axis direction without lengthening the lead screw of the STM. More specifically, the fifth lens unit L5 and the sixth lens unit L6 move in the optical axis direction by the motor sliding tube 100 and the STM. This makes it possible to shorten the lead screw of the STM as compared with a case in which the fifth lens unit L5 and the sixth lens unit L6 are moved only by the STM. Therefore, it is possible to reduce rattling by the tipping or the like of the lead screw.

EXPLANATION OF REFERENCE NUMERALS

L1: first lens unit, L2: second lens unit, L3: third lens unit, L4: fourth lens unit, L5: fifth lens unit, L6: sixth lens unit, L7: seventh lens unit, OA: optical axis, PI5: fifth unit photo interrupter, PI6: sixth unit photo interrupter, STM 5: fifth unit motor, STM 6: sixth unit motor, 1: Camera, 2: lens barrel, 3: camera body, 4: image sensor, 11: first unit frame 12: first unit sliding tube, 21: second unit frame, 31: third unit frame, 41: fourth unit frame, 43: fourth unit holding portion, 44: front wall portion, 45: tube portion, 45a: straight groove, 42: aperture unit, 42a: STM for aperture, 50: fifth units frame, 51: fifth units holding portion, 52: fifth unit hood portion, 52a: light shielding line, 60: sixth unit frame, 61: sixth unit holding portion, 62: sixth unit hood portion, 62a: light shielding line, 65: cut out portion 70: seventh unit frame, 71: seventh unit holding portion, 72: seventh unit hood portion, 72a: light shielding line, 73: seventh unit sliding tube 81: zoom ring, 82: outer cam tube, 83: inner cam tube, 83a: circumferential groove, 84: outer fixed tube, 84a: photo interrupter, 85: inner fixed tube, 86: focus ring, 86a: reflective tape, 86b: light shielding line, 88: main board, 90: control unit, 91: first connecting pin, 92: second connecting pin 100: motor sliding tube, 101: cam pin, 151: main guide bar, 152: sub guide bar, 161: main guide bar, 162: sub guide bar, 170: guide bar retaining member, 171: coil spring 500: fifth lens unit driving unit, 501: unit frame, 501a: unit fixing portion, 501b: fixing portion, 501c: lead screw holding portion, 502: lead screw, 503: moving rack, 504: gearing portion, 505a: rear small diameter portion, 505b: middle diameter portion, 505c: large diameter portion, 505d: front small diameter portion, 506: coil spring, 510: protrusion, 511: main guide bar engaging portion, 511a: front wall, 511b: rear wall, 511c: side wall, 511d: side wall, 511e: guide bar insertion hole, 512: light shielding portion, 513: rack engaging portion, 513a: front arm, 513b: rear arm, 513d: through hole, 513e: through hole, 552: sub guide bar engaging portion, 560: projection,

600: sixth lens unit driving unit, 610: protrusion, 611: main guide bar engaging portion, 611a: front wall, 611b: rear wall, 612: light shielding portion, 622: main guide bar engaging portion, 652: sub guide bar engaging portion

The invention claimed is:

1. A lens barrel comprising:
a first lens unit;
a first lens holding frame that holds an outer edge of the first lens unit;
a first driving unit that causes the first lens holding frame to move in an optical axis direction;
a second lens unit that is disposed on an object side of the first lens unit in an optical axis direction;
a second lens holding frame that holds an outer edge of the second lens unit;
a second driving unit that causes the second lens holding frame to move in the optical axis direction;
a first hood portion that extends toward the object side from the first lens holding frame and includes a light shielding line formed on an inner surface of the first hood portion, the inner surface being located at an inner side of the first hood portion in a direction intersecting an optical axis; and
a protrusion that protrudes outward from the second lens holding frame,
wherein no other lens is located between (i) a lens of the first lens unit disposed closest to the object side and (ii) a lens of the second lens unit disposed closest to an image side in the optical axis direction, and
in a case in which the first lens holding frame and the second lens holding frame are close in distance to each other, the protrusion enters a region which extends toward the first lens holding frame to the object side and in which the first hood portion is not provided in a circumferential direction.

2. The lens barrel according to claim 1, wherein the first hood portion is configured to prevent incidence of unwanted light.

3. The lens barrel according to claim 1, wherein
in a case in which the first lens unit and the second lens unit are closest in distance to each other, the second lens holding frame overlaps with the first hood portion at least at a portion in a radial direction.

4. The lens barrel according to claim 1, further comprising:
a third lens unit disposed on an image side of the first lens unit in the optical axis direction; and
a third lens holding frame that holds an outer edge of the third lens unit and includes a third hood portion extending toward the object side in the optical axis direction,
wherein in a case in which the first lens unit and the third lens unit are closest in distance to each other, the first lens holding frame overlaps with the third hood portion at least at a portion in a radial direction.

5. The lens barrel according to claim 4, wherein a size of the third hood portion in the radial direction is larger than a size of the first lens unit in the radial direction.

6. The lens barrel according to claim 4, further comprising:
a fourth lens unit disposed on an object side of the second lens unit in the optical axis direction; and
a fourth lens holding frame that holds an outer edge of the fourth lens unit,
wherein the second lens holding frame includes a second hood portion extending toward the object side in the optical axis direction, and
wherein in a case in which the fourth lens unit and the second lens unit are closest in distance to each other, the fourth lens holding frame overlaps with the second hood portion at least at a portion in the radial direction.

7. The lens barrel according to claim 6, wherein a size of the second hood portion in the radial direction is larger than a size of the fourth lens unit in the radial direction.

8. The lens barrel according to claim 6, wherein at least one of the first hood portion, the second hood portion, and the third hood portion includes a step on its inner periphery.

9. The lens barrel according to claim 1, further comprising an inner barrel including therein the first driving unit and the second driving unit.

10. The lens barrel according to claim 9, wherein
the inner barrel includes a first opening for disposing the first driving unit and a second opening for disposing the second driving unit, and
the first hood portion is configured to prevent incidence of unwanted light from the first opening and the second opening.

11. The lens barrel according to claim 9, wherein
the inner barrel includes a third opening for disposing a first detecting unit that detects the first lens holding frame, and a fourth opening for disposing a second detecting unit that detects the second lens holding frame, and
the first hood portion is configured to prevent incidence of unwanted light from the third opening and the fourth opening.

12. An imaging device comprising the lens barrel according to claim 1.

* * * * *